(12) United States Patent
O'Brien et al.

(10) Patent No.: US 12,176,010 B1
(45) Date of Patent: Dec. 24, 2024

(54) SYSTEMS FOR AND METHODS FOR IMPROVED LASER MODE HOP DETECTION FOR HARD DISK DRIVE APPLICATIONS

(71) Applicant: Avago Technologies International Sales Pte. Limited, Singapore (SG)

(72) Inventors: Scott O'Brien, Eden Prairie, MN (US); Nathan Rudd, Rosemount, MN (US); Jaydip Bhaumik, Boulder, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/492,133

(22) Filed: Oct. 23, 2023

Related U.S. Application Data

(60) Provisional application No. 63/506,529, filed on Jun. 6, 2023.

(51) Int. Cl.
*G11B 5/02* (2006.01)
*G11B 27/36* (2006.01)
*G11B 5/00* (2006.01)

(52) U.S. Cl.
CPC .............. *G11B 5/02* (2013.01); *G11B 27/36* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,809,088 A * | 2/1989 | Lofgren | G11B 20/10194 |
| 5,623,378 A * | 4/1997 | Shibasaki | G11B 19/04 |
| 10,366,722 B1 * | 7/2019 | Mendonsa | G11B 5/012 |
| 2015/0380031 A1 * | 12/2015 | Boone, Jr. | G11B 5/6088 369/13.33 |
| 2017/0162222 A1 * | 6/2017 | Matousek | G11B 5/40 |

* cited by examiner

*Primary Examiner* — Peter Vincent Agustin
(74) *Attorney, Agent, or Firm* — Foley & Lardner LLP

(57) ABSTRACT

A solution for providing laser mode hop detection in hard disk drives can include a first circuit to provide a signal having a step voltage whose amplitude is adjustable according to a first control signal. The solution can include a second circuit causing the signal to be delayed by a time period to produce a delayed signal, the time period adjustable according to a second control signal. The solution can include a filter to receive the delayed signal as input and provide as output an offset signal corresponding to a frequency response a sensor. The system can subtract the offset signal from a sensor signal of a sensor to provide an output.

20 Claims, 18 Drawing Sheets

1300

| TDel_Error | | Filt_Error | | MH_P | | MH_N | | MH | |
|---|---|---|---|---|---|---|---|---|---|
| Filter | ▷ | Filter | ▷ | Filter | ▷ | Filter | ▷ | o | x |
| 1n | | 975m | | o | | o | | o | |
| -1n | | 1 | | o | | o | | o | |
| 413.6e-27 | | 1 | | o | | o | | o | |
| 1n | | 1 | | o | | o | | o | |
| -1n | | 1.025 | | o | | o | | o | |

| TDel_Error (Filter ▽) | Filt_Error (Filter ▽) | MH_P (Filter ▽) | MH_N (Filter ▽) | MH (x) |
|---|---|---|---|---|
| -2n | 975m | 0 | 0 | 0 |
| -2n | 1 | 0 | 0 | 0 |
| -2n | 1.025 | 0 | 0 | 0 |
| -2n | 1.05 | 0 | 0 | 0 |
| -1n | 975m | 0 | 0 | 0 |
| -1n | 1 | 0 | 0 | 0 |
| -1n | 1.025 | 0 | 0 | 0 |
| -1n | 1.05 | 0 | 0 | 0 |
| 413.6e-27 | 975m | 0 | 0 | 0 |
| 413.6e-27 | 1 | 0 | 0 | 0 |
| 413.6e-27 | 1.025 | 0 | 0 | 0 |
| 1n | 975m | 0 | 0 | 0 |
| 1n | 1 | 0 | 0 | 0 |
| 1n | 1.025 | 0 | 0 | 0 |
| 2n | 950m | 0 | 0 | 0 |
| 2n | 975m | 0 | 0 | 0 |
| 2n | 1 | 0 | 0 | 0 |
| 2n | 1.025 | 0 | 0 | 0 |

| Corner | TDel_Error | Filt_Error | MH_P | MH_N | MH |
|---|---|---|---|---|---|
| Filter ▽ | Filter ▽ | 0.9 1.1 ✕ | Filter ▽ | Filter ▽ | 0 ✕ |
| MH_Detect_Cal_89 | -5n | 975m | 0 | 0 | 0 |
| MH_Detect_Cal_... | -5n | 1.1 | 0 | 0 | 0 |
| MH_Detect_Cal_69 | -4n | 950m | 0 | 0 | 0 |
| MH_Detect_Cal_90 | -4n | 975m | 0 | 0 | 0 |
| MH_Detect_Cal_... | -4n | 1.1 | 0 | 0 | 0 |
| MH_Detect_Cal_70 | -3n | 950m | 0 | 0 | 0 |
| MH_Detect_Cal_91 | -3n | 975m | 0 | 0 | 0 |
| MH_Detect_Cal_... | -3n | 1.1 | 0 | 0 | 0 |
| MH_Detect_Cal_71 | -2n | 950m | 0 | 0 | 0 |
| MH_Detect_Cal_92 | -2n | 975m | 0 | 0 | 0 |
| MH_Detect_Cal_... | -2n | 1.1 | 0 | 0 | 0 |
| MH_Detect_Cal_51 | -1n | 925m | 0 | 0 | 0 |
| MH_Detect_Cal_72 | -1n | 950m | 0 | 0 | 0 |
| MH_Detect_Cal_93 | -1n | 975m | 0 | 0 | 0 |
| MH_Detect_Cal_52 | 413.6e-27 | 925m | 0 | 0 | 0 |
| MH_Detect_Cal_73 | 413.6e-27 | 950m | 0 | 0 | 0 |
| MH_Detect_Cal_94 | 413.6e-27 | 975m | 0 | 0 | 0 |
| MH_Detect_Cal_53 | 1n | 925m | 0 | 0 | 0 |
| MH_Detect_Cal_74 | 1n | 950m | 0 | 0 | 0 |
| MH_Detect_Cal_95 | 1n | 975m | 0 | 0 | 0 |
| MH_Detect_Cal_54 | 2n | 925m | 0 | 0 | 0 |
| MH_Detect_Cal_75 | 2n | 950m | 0 | 0 | 0 |
| MH_Detect_Cal_96 | 2n | 975m | 0 | 0 | 0 |
| MH_Detect_Cal_55 | 3n | 925m | 0 | 0 | 0 |
| MH_Detect_Cal_76 | 3n | 950m | 0 | 0 | 0 |
| MH_Detect_Cal_97 | 3n | 975m | 0 | 0 | 0 |
| MH_Detect_Cal_35 | 4n | 900m | 0 | 0 | 0 |
| MH_Detect_Cal_56 | 4n | 925m | 0 | 0 | 0 |
| MH_Detect_Cal_77 | 4n | 950m | 0 | 0 | 0 |
| MH_Detect_Cal_98 | 4n | 975m | 0 | 0 | 0 |
| MH_Detect_Cal_36 | 5n | 900m | 0 | 0 | 0 |
| MH_Detect_Cal_57 | 5n | 925m | 0 | 0 | 0 |
| MH_Detect_Cal_78 | 5n | 950m | 0 | 0 | 0 |
| MH_Detect_Cal_99 | 5n | 975m | 0 | 0 | 0 |

| TDel_Error | Filt_Error | MH_P | MH_N | MH |
|---|---|---|---|---|
| Filter | | Filter | Filter | 0 |
| -6n | 1.1 | 0 | 0 | 0 |
| -5n | 1.075 | 0 | 0 | 0 |
| -5n | 1.1 | 0 | 0 | 0 |
| -4n | 1.05 | 0 | 0 | 0 |
| -4n | 1.075 | 0 | 0 | 0 |
| -4n | 1.1 | 0 | 0 | 0 |
| -3n | 1.025 | 0 | 0 | 0 |
| -3n | 1.05 | 0 | 0 | 0 |
| -3n | 1.075 | 0 | 0 | 0 |
| -2n | 1.025 | 0 | 0 | 0 |
| -2n | 1.05 | 0 | 0 | 0 |
| -2n | 1.075 | 0 | 0 | 0 |
| -1n | 1 | 0 | 0 | 0 |
| -1n | 1.025 | 0 | 0 | 0 |
| -1n | 1.05 | 0 | 0 | 0 |
| 413.6e-27 | 975m | 0 | 0 | 0 |
| 413.6e-27 | 1 | 0 | 0 | 0 |
| 413.6e-27 | 1.025 | 0 | 0 | 0 |
| 1n | 950m | 0 | 0 | 0 |
| 1n | 975m | 0 | 0 | 0 |
| 1n | 1 | 0 | 0 | 0 |
| 2n | 950m | 0 | 0 | 0 |
| 2n | 975m | 0 | 0 | 0 |
| 3n | 925m | 0 | 0 | 0 |
| 3n | 950m | 0 | 0 | 0 |
| 4n | 900m | 0 | 0 | 0 |
| 4n | 925m | 0 | 0 | 0 |
| 4n | 950m | 0 | 0 | 0 |
| 5n | 900m | 0 | 0 | 0 |
| 5n | 925m | 0 | 0 | 0 |
| 6n | 900m | 0 | 0 | 0 |

| TDel_Error | Filt_Error | MH_P | MH_N | MH |
|---|---|---|---|---|
| Filter ▽ | Filter ▽ | Filter ▽ | Filter ▽ | o / x |
| -10n | 1.075 | o | o | o |
| -10n | 1.1 | o | o | o |
| -8n | 1.075 | o | o | o |
| -8n | 1.1 | o | o | o |
| -6n | 1.05 | o | o | o |
| -6n | 1.075 | o | o | o |
| -4n | 1.025 | o | o | o |
| -4n | 1.05 | o | o | o |
| -2n | 1.025 | o | o | o |
| -2n | 1 | o | o | o |
| -827.2e-27 | 1 | o | o | o |
| 2n | 975m | o | o | o |
| 2n | 1 | o | o | o |
| 4n | 950m | o | o | o |
| 4n | 975m | o | o | o |
| 6n | 925m | o | o | o |
| 6n | 950m | o | o | o |
| 8n | 900m | o | o | o |
| 8n | 925m | o | o | o |
| 10n | 900m | o | o | o |

FIG. 17

SYSTEMS FOR AND METHODS FOR IMPROVED LASER MODE HOP DETECTION FOR HARD DISK DRIVE APPLICATIONS

CROSS-REFERENCE TO RELATED PATENT APPLICATIONS

This application claims the benefit of priority from U.S. Provisional Patent Application No. 63/506,529, filed Jun. 6, 2023, which is incorporated herein by reference in its entirety and for all purposes.

TECHNICAL FIELD

This disclosure generally relates to systems and methods for control and operation of hard disk drives (HDDs), including, but not limited to, laser mode hop detection in HDDs.

BACKGROUND

Hard disk drives (HDDs) can be used for storing data in computers and other electronic devices. HDDs can include a variety of designs and components, such as magnetically sensitive platters on which data can be written or read and actuator arms for reading or writing data. HDDs can utilize lasers for their operation.

SUMMARY

Heat assisted magnetic recording (HAMR) is an energy assisted technique in Hard Disc Drives (HDDs) in which a laser can be used to heat a localized area of a high coercivity media to enable a more efficient data recording. The consistency and size of the region the laser heats on the disk surface can be important to maximize recording density as it can define track and bit pitch. The region on the disk surface heated by the laser in order to record the data can be referred to as the "spot size". While recording the data, the laser of the HDD can experience a mode hop, which can include a sudden shift in the operating mode or characteristics of the laser, resulting in changes to the laser output properties, such as the frequency or power of the laser output. These sudden changes caused by the mode hop can cause an abrupt change in the spot size, which can result in imprinting a phase shift into the recorded data that exceeds the recovery capability of the read channel of the HDD, causing the data written during the mode hop to be corrupted. In such instances, the system can identify that a mode hop exceeding a previously determined allowable threshold has occurred and re-write the damaged sector prior to clearing the data buffer. If this corrective action is not implemented prior to clearing the data buffer, the data may not be retrievable, making an adequate mode hop detection an important feature in HAMR systems.

When HDDs shift from a read operation in which data is read from the HDD to a write operation in which the data is written to the HDD, a laser power output can be increased from a lower laser power output (e.g., during the read operation) to a higher laser power output (during the write operation). As a result, for a certain time following a read-to-write (R2W) transition (e.g., tens or hundreds of nanoseconds after the transition), the power monitoring device (e.g., can output a signal that resembles that of a mode hop to the Preamplifier of the HDD system, making it difficult to determine if a real mode hop has occurred or if the signal is due to a R2W transition. As a result, it can be challenging to reliably detect real mode hop events of the laser when they coincide with a time period (e.g., of about 1 to 2 microseconds) immediately following a R2W mode transition. The present solution overcomes this challenge by allowing for a more reliable and accurate hop detection for the time period immediately following the R2W mode transition, by providing a circuit that subtracts from the laser detector signal a signal matching the frequency response of the detector, allowing for reliable detection of the mode hop signals for the entire duration of the HDD write mode operation, including the time interval immediately following the R2W transition.

An aspect is directed to a system. The system can include a first circuitry to generate a first signal representing a transition from a read operation of a storage device to a write operation of the storage device and delay the first signal according to a first time period. The system can include a filter coupled with the first circuitry to filter, from the delayed first signal, frequencies above a threshold and output a second signal according to a second time period of a frequency response of the filter. The system can include a second circuitry to receive a measurement of an optical output of a laser of the storage device going through the transition and having a mode hop of the laser, a frequency response of the second circuitry indicated by the measurement and corresponding to the frequency response of the filter. The second circuitry can be configured to subtract the second signal from the measurement to output a third signal identifying an occurrence of the mode hop of the laser.

The first signal can include an increase from a first voltage corresponding to the read operation to a second voltage corresponding to the write operation and wherein the first time period corresponds to a time of a start of the transition. A difference between the first voltage and the second voltage is typically within the range of 1 mV and 1000 mV. The value can be adjustable according to a first control signal for controlling the first circuitry.

The system can include a delay circuit of the first circuitry to align a time of the transition indicated by the second signal with a time of the transition indicated by the measurement using the first time period. The first time period can be adjustable to a time duration value typically within a range of between 5 ns and 10 us according to a second control signal for controlling a delay circuit of the first circuitry.

The system can include a resistor of the filter. The resistor can be coupled with an output of the delay circuit of the first circuitry. The system can include a capacitor of the filter. The capacitor can have a first contact coupled with the resistor and a second contact coupled with a ground. The resistor and the capacitor can configure the frequency response of the filter to match the frequency response of the second circuitry.

The system can include a sensor of the second circuitry. The sensor can be configured provide a signal of the sensor corresponding to the optical output of the laser. The system can include an amplification circuit of the second circuitry to amplify the signal of the sensor and produce the measurement. The sensor can be an optoelectronic transducer, such as a bolometer or a photodetector. The amplification circuit can include a differential amplifier configured to subtract the second signal from the measurement to output the third signal.

The second time period can correspond to a time duration in which the measurement from a sensor of the second circuitry transitions from a first level of the measurement corresponding to the read operation to a second level of the measurement corresponding to the write operation. The measurement can include a first portion corresponding to a disturbance in the optical output of the laser caused by an increase in power input into the laser responsive to the transition and a second portion corresponding to the mode hop of the laser occurring during or after the disturbance.

The second circuitry can be configured to subtract the second signal from the measurement to eliminate the first portion of the measurement from the third signal identifying an occurrence of the mode hop of the laser. The mode hop of the laser can occur anytime following or around a start of the transition.

The third signal can be input into a third circuitry. The third circuitry comprising at least: a bandpass filter, an amplifier, and a peak detector to detect the occurrence of the mode hop event responsive to a peak in a signal output from the amplifier and filtered by the bandpass filter exceeding a threshold value of the peak detector.

An aspect is directed to a method. The method can include a first circuitry generating a first signal representing a transition from a read operation of a storage device to a write operation of the storage device. The method can include the first circuit delaying the first signal according to a first time period. The method can include a filter coupled with the first circuitry filtering, from the delayed first signal, frequencies above a threshold to output a second signal according to a second time period of a frequency response of the filter. The method can include a second circuitry receiving a measurement of an optical output of a laser of the storage device going through the transition and having a mode hop of the laser. The measurement can indicate a frequency response of the second circuitry corresponding to the frequency response of the filter. The second circuitry can subtract the second signal from the measurement to output a third signal identifying an occurrence of the mode hop of the laser.

The first signal can include an increase from a first voltage corresponding to the read operation to a second voltage corresponding to the write operation and the first time period corresponds to a time of a start of the transition. A difference between the first voltage and the second voltage is typically between 1 mV and 1000 mV. The value can be adjustable using a first control signal for controlling the first circuitry.

The method can include a delay circuit of the first circuitry aligning, using the first time period, a time of the transition indicated by the second signal with a time of the transition indicated by the measurement. The first time period can be a value within a range of between 5 nanoseconds and 10 microseconds. The value can be adjustable according to a second control signal for controlling a delay circuit of the first circuitry.

The method can include a resistor of the filter and a capacitor of the filter configuring the frequency response of the filter to match the frequency response of the second circuitry. The resistor can be coupled with an output of the delay circuit of the first circuitry and the capacitor can include a first contact coupled with the resistor and a second contact coupled with a ground. The method can include providing, by a sensor of the second circuitry, a signal of the sensor corresponding to the optical output of the laser. The method can include an amplification circuit of the second circuitry amplifying the signal of the sensor and produce the measurement. The sensor can be one of a bolometer or a photodetector and the amplification circuit can include a differential amplifier configured to subtract the second signal from the measurement to output the third signal.

The second time period can correspond to a time duration in which the measurement from a sensor of the second circuitry transitions from a first level of the measurement corresponding to the read operation to a second level of the measurement corresponding to the write operation. The measurement can include a first portion corresponding to a disturbance in the optical output of the laser caused by an increase in power input into the laser responsive to the transition and a second portion corresponding to the mode hop of the laser occurring during or after the disturbance.

The method can include the second circuitry subtracting the second signal from the measurement to eliminate, from the third signal, a first portion of the measurement identifying an occurrence of the mode hop of the laser. The mode hop of the laser can occur anytime following a start of the transition.

An aspect is directed to a storage device system. The storage device system can include a voltage generator to generate a first signal representing a transition from a read operation of a storage device to a write operation of the storage device. The storage device system can include a delay circuit to delay the first signal according to a first time period. The storage device system can include a filter coupled with the delay circuit to filter, from the delayed first signal, frequencies above a threshold, and output a second signal according to a second time period of a frequency response of the filter. The storage device system can include an amplifier to receive, from the filter, the second signal and to receive, from a sensor, a measurement of an optical output of a laser of the storage device going through the transition and having a mode hop of the laser. The measurement can be indicative of a frequency response of the second circuitry matching the frequency response of the filter. The storage device system can include the amplifier to subtract the second signal from the measurement to output a third signal identifying an occurrence of the mode hop of the laser.

BRIEF DESCRIPTION OF THE DRAWINGS

These and other aspects and features of the present embodiments will become apparent to those ordinarily skilled in the art upon review of the following description of specific embodiments in conjunction with the accompanying figures.

FIG. 13-17 are examples of tables or operation results of a mode hop detection system of the present solution.

DETAILED DESCRIPTION

Figure 1:
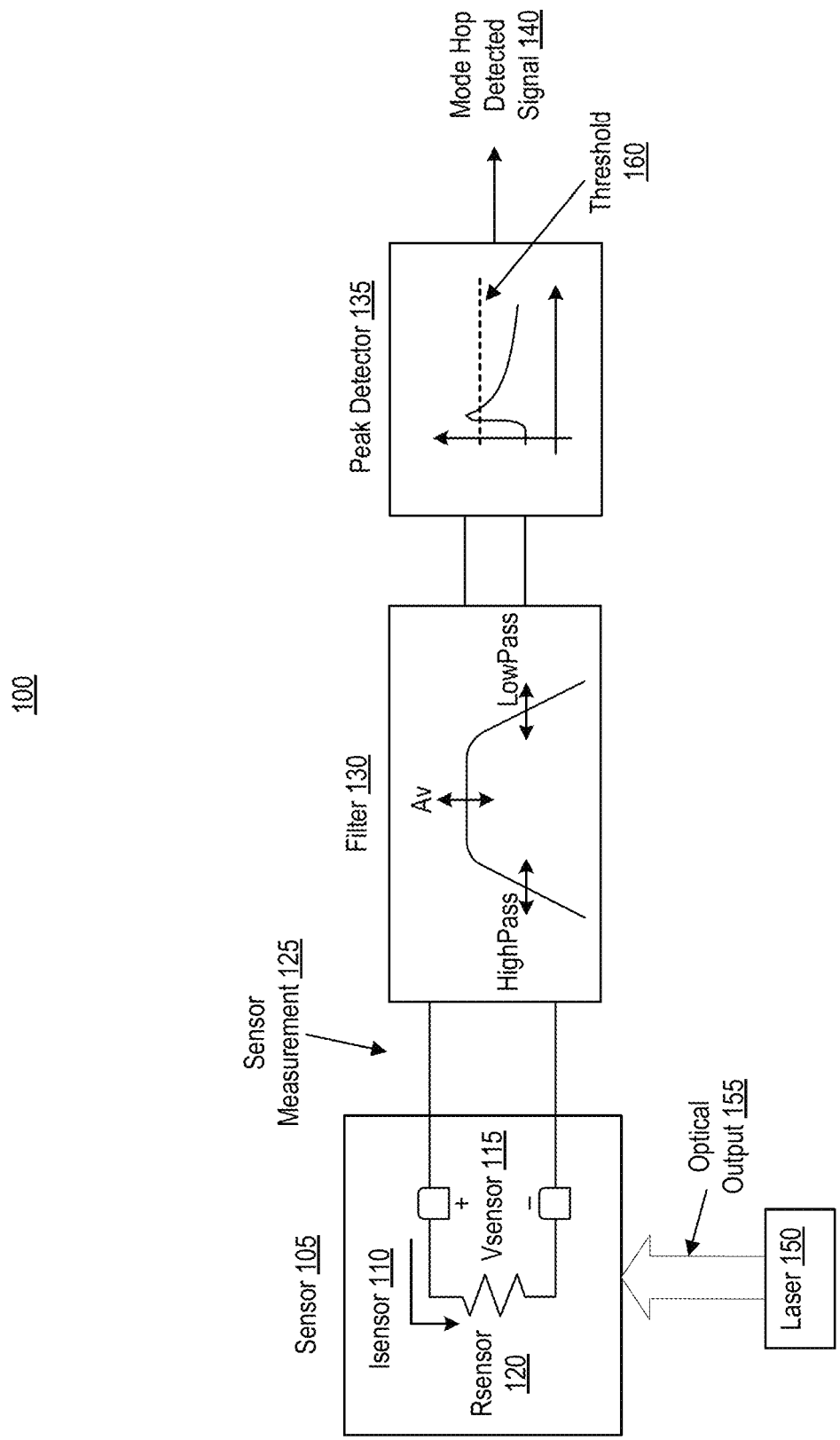
FIG. 1 is an example block diagram of a mode hop detection system using a transducer sensor to detect mode hops of a laser (e.g., laser diode) in a hard disk drive (HDD).

The present embodiments shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in hardware or in software should not be limited to such implementation alone, but they can include embodiments implemented in hardware, or software or any combinations of software and hardware, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

While HAMR systems can include different styles of power monitoring transducers or sensors, such as photodiodes and bolometers, the technical solutions can be applied to any power monitoring device. While a bolometer can be used for an illustrated example, any other monitoring transducer can be used in a system solution, including any resistive temperature detector, capacitive sensors, hall effect sensor, piezoelectric sensor, magnetic sensors, semiconductor photodetector or any other sensor or detector. Moreover, a mode hop may not have a preferred polarity and therefore the event can cause an increase or a decrease in laser power. While illustrated examples can discuss instances of a mode hop with a positive polarity, it is understood that the solution can similarly apply to either polarity.

Because the technical solutions provided herein can accommodate the characteristics of any power monitoring device, the present solution can address the problem of timely laser hop detection (or any other electrical or electronic time-constrained detection) for a variety of applications, including any fast or time constrained detections. The technical solutions can provide advancements in power monitor sensitivity and frequency response with the range of amplitude, delay, and frequency response tuning. HAMR systems can use a power change between a read and write operation (e.g., read and write modes) and the technical solutions can use it to provide improvements for HAMR HDD devices and related applications. The technical solutions provide an improved and accurate mode hop detection for a larger portion of a write event, including coverage over the entire write event or time period during which write operation occurs.

FIG. 1 illustrates an example of a block diagram of a mode hop detection system 100. Mode hop detection system 100 can include a circuit or a circuitry that can include and utilize a transducer sensor 105 measuring an optical output 155 from a laser 150 and providing a sensor measurement 125 to a filter 130. Filter 130 can filter the received sensor measurement 125 and provide its output to a peak detector that can utilize a threshold 160 to provide a mode hop detected signal 140.

Laser 150 can include any laser or a laser diode emitting focused optical output 155 (e.g., light) onto the surface of the HDD's magnetic recording media, creating localized heated regions. Optical output 155 of a laser 150 can include any emitted light or electromagnetic radiation produced by the laser 150, which can be characterized by specific properties of the laser 150 such as a wavelength, intensity, and coherence of the electromagnetic radiation emitted. As the heat reduces coercivity of the media, HDD can more easily write data to the disk, allowing for higher recording densities and improved storage capacity in HDDs. Laser 150 can operate at a power range of between one or more milliwatts to one or more watts. Optical output 155 can include any optical output range of between 400 nm to 10 um, including for example 800-1000 nm range.

Sensor 105 can be placed or located in proximity of the laser 150 or its optical output 155 thereby monitoring a fraction of the optical output 155. Sensor 105 can include any sensor for measuring optical output 155 from a laser 150. Sensor 105 can be any device converting one type of energy to another, including for example an optoelectronic transducer (e.g., a bolometer or a photodetector). Sensor 105 can include and be characterized by an electrical resistance RSensor 120 that can be inherent in the sensor 105. Because the sensor 105 can be driven with a DC bias current ISensor 110, a voltage VSensor 115 (e.g., voltage across the sensor 105) can be detected, measured, and monitored. Monitoring the ISensor 110 and/or VSensor 115 can allow the present technical solutions to react when the sensor 105 (e.g., the bolometer or photodetector) is exposed to optical output 115 (e.g., changes in optical output due to changes in laser power input). For example, power perturbation can cause a perturbation in the RSensor 120 and can affect the VSensor voltage, causing the change in the sensor measurement 125.

VSensor 115 voltage of the sensor 105, which can reflect any change in optical output 155 signal, can be input into or passed through filter 130 as a sensor measurement 125. In some examples, depending on the type of sensor 105, Isensor 110 current can be input into the filter 130 as the sensor measurement 125. Filter 130 receiving the sensor measurement 125 can include a bandpass filter and can include a gain circuitry with a programmable gain for amplifying or strengthening the sensor measurement 125. Filter 130 can have corner frequencies (e.g., frequency poles) to remove DC signals or contents, which can be large, as well as remove any high frequency signals or noise. The output of the filter 130 (e.g., bandpass filter) can be fed into or passed to a peak detection circuit or peak detector 135. Peak detector 135 can include and utilize a programmable threshold 150 to detect if the filtered sensor measurement includes a peak, indicating the occurrence of a mode hop event. A mode hop event can include any rapid and unintended change (e.g., disturbance) in the operating mode or characteristics of a laser 150, resulting in a sudden shift in output properties (e.g., frequency, mode, or power) of the laser. The programmable threshold 160 can include or be coupled with a circuit that can send a digital output to fault monitoring control circuitry. The peak detector 135 can detect mode hop events that can exceed a programmable threshold in either polarity (positive or negative edges). When the filtered signal exceeds the threshold 160, the peak detector 135 can provide or output a mode hop detected signal 140, indicative that the mode hop event has been detected. This can, in turn, allow the HDD system to utilize the circuitry or functionality for correcting any corrupted data or take corrective action with the laser 150.

Figure 2:
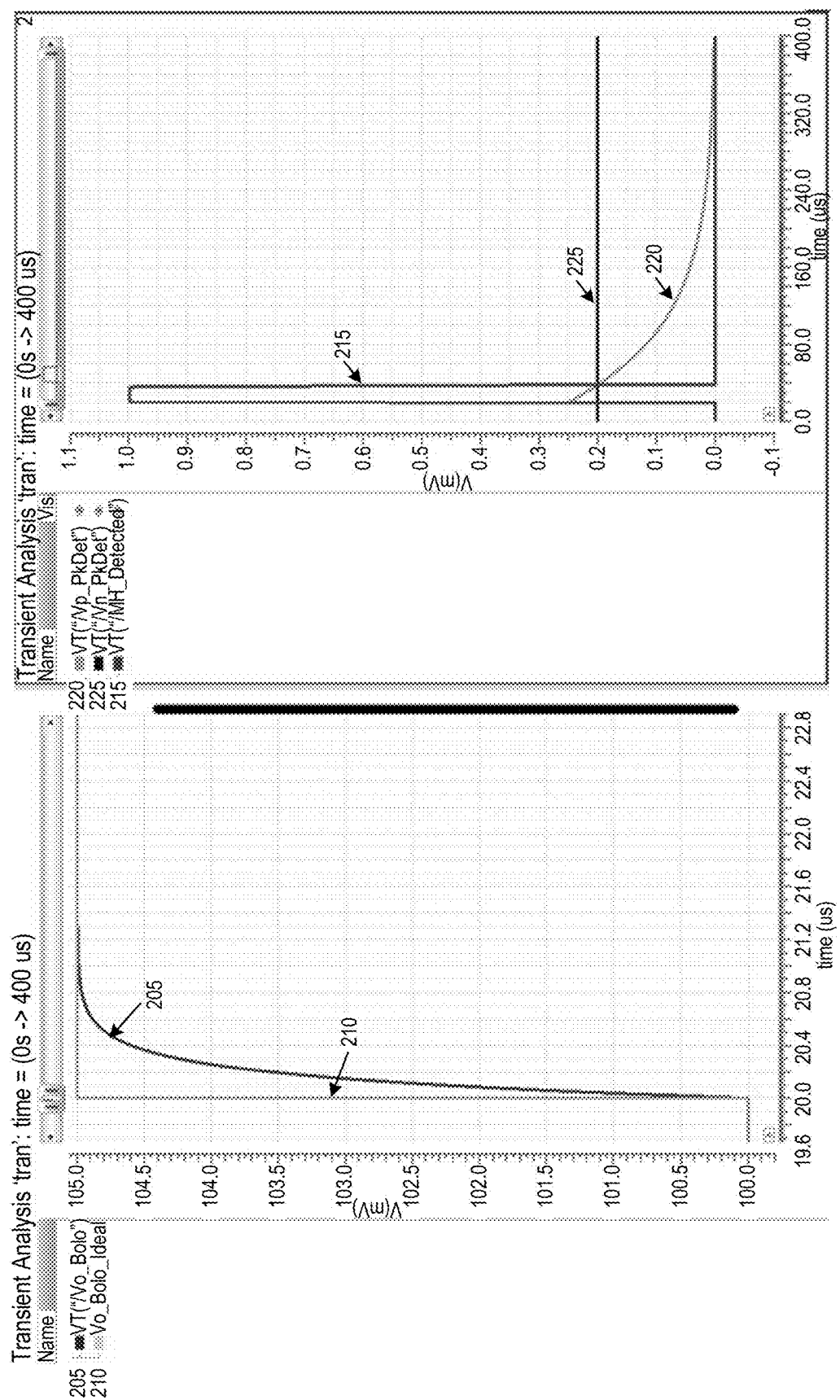
FIG. 2 is an example waveform of the operation or results of a mode hop detection system.

FIG. 2 shows an example 200 of waveforms of the operation or results of the system 100 in FIG. 1. In this example, a mode hop can occur at time=20 us. The mode hop event can be indicated by plot line 210 showing a step function increasing from a lower voltage reading of 100 mV to a higher voltage reading of 105 mV, instantly. If the Bolometer had a very high bandwidth the voltage across it would increase almost instantaneously at that time (e.g., as shown by plot waveform 210). However, as bolometers may have a bandwidth of only 1 MHz, they would respond with approximately 1 microsecond (us) delay. Therefore, it would take about 1 us for the bolometer to fully respond to such a mode hop event, as indicated by plot waveform 205. If the signal is then amplified or gained up by 50V/V (e.g., via an amplifier) and passed through a 2 kHz high pass filter 130, the results could be expressed with plot waveform 220 (e.g., "Vp_PkDet"). If the user sets the mode hop detection threshold 160 at 200 mV referred to the input of the Peak Detector 135 (e.g., shown by plot waveform 225), a fault condition can be reported (e.g., plot waveform 215), so long as waveform 220 is greater than waveform 225 (e.g., Vp_PkDet>Vn_PkDet). This digital signal in which a "1" represents logical high and a "0" represents logical low can be subsequently latched and reported to the system controller so that a re-write may be initiated (e.g., to fix any corrupted data caused by the mode hop event).

As shown in example 200, it can take 1 us for the system 100 to detect the mode hop event and this amount of time can equate to a significant portion of recording duration. This can be a consequence of the low bandwidth of the sensor 105. A low bandwidth sensor 105 can rely on a low high pass corner (HPC) to enable a usable Signal-to-Noise ratio (SNR). Also, an additional consequence of the low HPC can be that it takes >200 us for the Peak Detector input to return back to its steady state value. This can create a challenge for accurately detecting mode hop events subsequent to the first one.

A read operation in an HDD can include the process of retrieving data from the storage media, such as by using a read/write head to access and read information stored on the disk. A write operation in an HDD can include the process of storing data onto the magnetic storage media by encoding it using a magnetic write head. The technical solutions of the present disclosure overcome challenges of the present day mode hop detection systems using a preamplifier circuit solution to allow detection of mode hop events even during time periods around the read to write (R2W) transitions.

A read to write (R2W) transition can include any switching of a storage device, such as a hard disk drive (HDD), from a read operation mode to a write operation mode, which can involve a change in the laser's power output (e.g., from lower power at read mode to a higher power at write mode), or other parameters to enable data recording. For example, when a preamplifier circuit is commanded to enter a write mode (e.g., from a read mode), the laser power can be increased rapidly to achieve the recording threshold. In the event of such R2W transitions, if the laser output power is not timely increased, then previously recorded data can be partially erased leading to insufficient storage duration (e.g., laser bias current too high during read) or new data may not be recorded at all (e.g., laser bias current too low during write). However, as an artifact of a sudden increase in laser power, the laser can experience disturbances around the R2W transition, making it difficult to detect an actual mode hop event during the disturbance.

Figure 3:
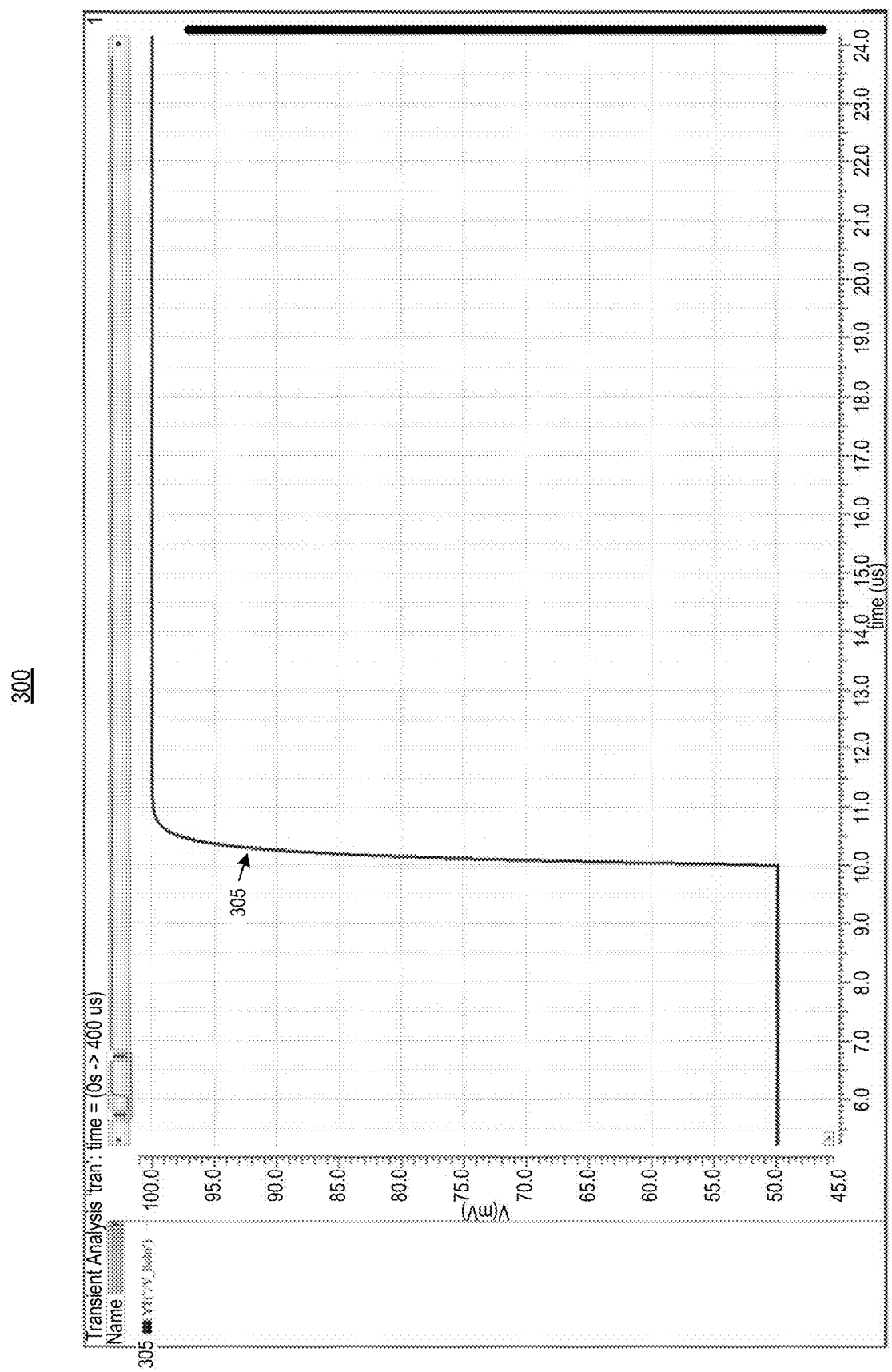
FIG. 3 is an example waveform of a read to write (R2W) transition in a mode hop detection system.

FIG. 3 depicts an example 300 of a plot waveform 305 showing R2W Transition occurring at time=10 us. Upon occurrence of the R2W transition, the sensor 105 (e.g., the bolometer) can output can increase in signal output from 50 mV (e.g., the sensor measurement 125 during read mode operation of the HDD) to 100 mV (e.g., the sensor measurement 125 during write mode operation of the HDD). Sensor 105 can make this transition from the 50 mV to 100 mV over the course of 1 us. This can be a response to the command for additional laser bias current (i.e., power) used for recording data by the HDD system.

Figure 4:
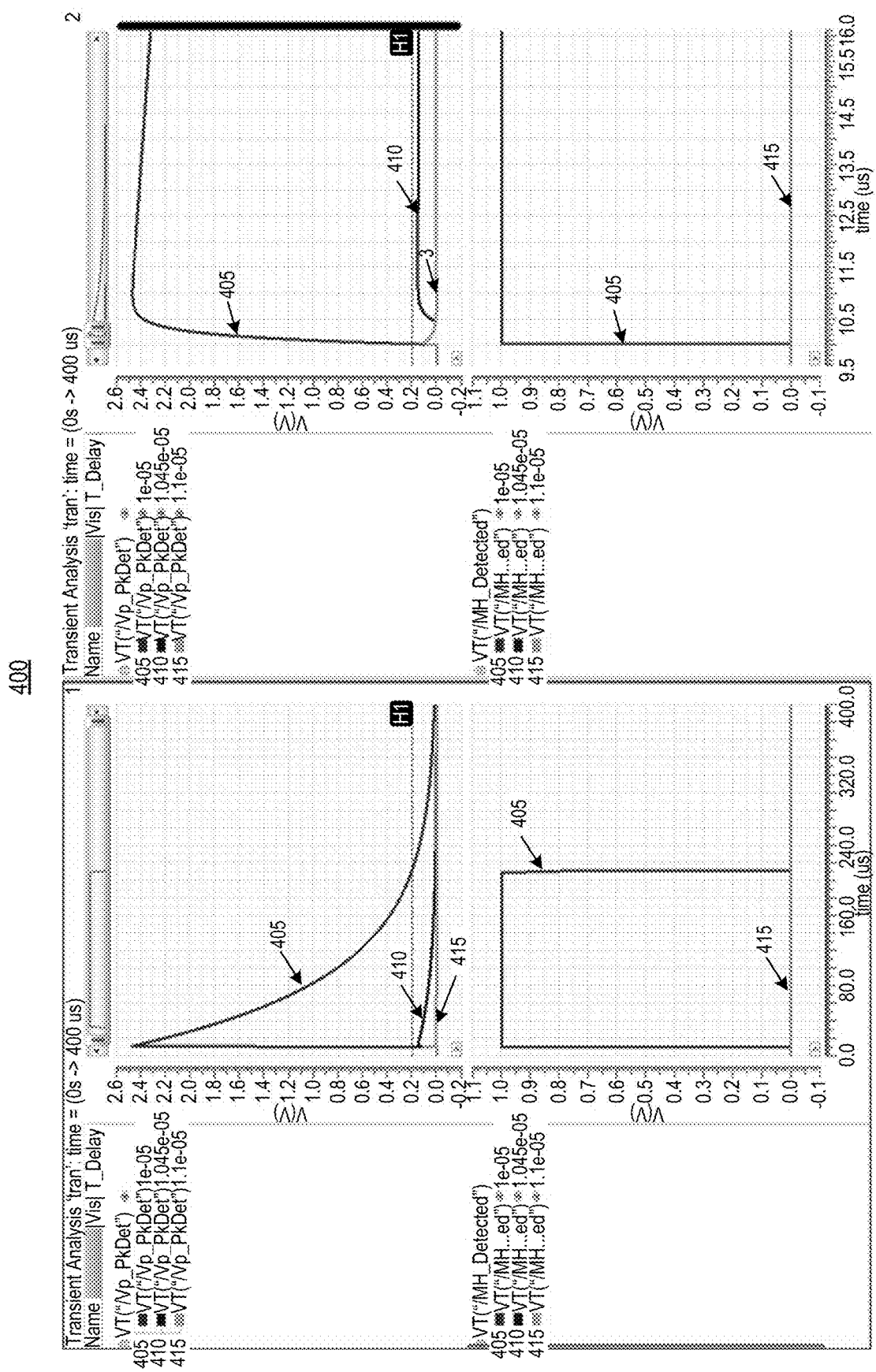
FIG. 4 is an example of waveforms of the operation or results of a mode hop detection system.

Referring to FIG. 4, example 400 of input and output of the peak detector 135 while retaining the mode hop detection threshold of 200 mV (e.g., shown as a dotted line) is illustrated. For example, a system can set (e.g., increase) the HPC of the detection path by multiple orders of magnitude (e.g., from 2 kHz to 20 MHz) upon the R2W transition, in order to minimize the disturbance at the input to the peak detector 135. If this is not done (e.g., waveforms 405) then a false mode hop can be reported for >200 us (e.g., waveform 405 at lower right plot). Having a false mode hop for 200 us can last longer than an entire write sector, providing insufficient mode hop protection for that period of time. Because increasing the HPC can have the effect of attenuating signals at lower frequencies and enabling faster baseline settling, it can be used for "squelching" the disturbance. Squelching can also involve other techniques such as using switches to open connections, using switches to short the inputs of peak detectors and cross-coupled differential pairs to re-route/cancel a signal. For FIGS. 4 and 5, the technique of increasing the HPC to ~20 MHz can be used.

The 410 waveforms can show that if the HPC is held high (~20 MHz) for a minimum of 450 ns after the R2W transition no false events can be reported due to the bias change. In this instance however, the write mode hop detection can be compromised as the residual disturbance that remains after moving the HPC down to 2 kHz at 450 ns can be significant (i.e., not too far below the 200 mV threshold). In this situation, the Preamplifier can be at risk for over-reporting a problem via minor mode hop events that have previously been determined to be unproblematic.

Also, if one were to extend the duration of the ~20 MHz HPC squelching interval to 1 us (waveforms 415) then the entire bias change event can be effectively suppressed. This can be good for the remainder of the write. However, an entire 1 us of coverage can be lost and a mode hop could occur anytime within the write, even within the first 1 us. In some instances, the initial 1 us after the R2W transition can be the most likely time for a mode hop event to occur as this is when the laser's operating point is changing (e.g., from a lower power level to a higher power level).

Figure 5:
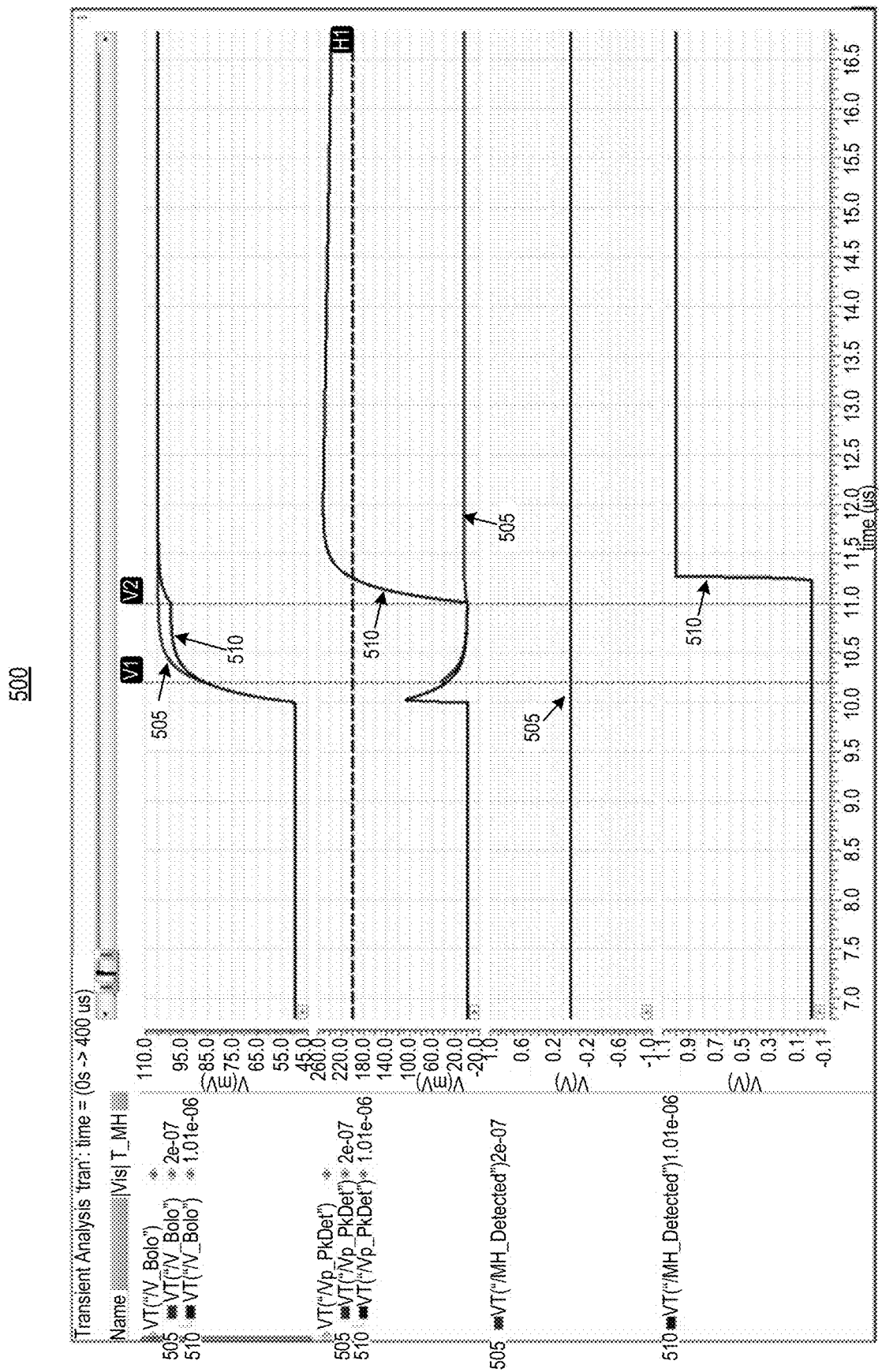
FIG. 5 is an example of waveforms of the operation or results of a mode hop detection system.

In some examples, a squelching (or masking) interval of approximately 1 us can be used to allow robust, accurate mode hop detection (i.e., no false reporting) for the remainder of the write. FIG. 5 illustrates an example 400 showing plots utilizing this masking interval and mode hop events occurring 200 ns into the write mode (e.g., waveform 505)

and 1 us into the write mode (e.g., waveform 510). In such implementation, only the event at 1 us after the R2W transition can be detected. The data from the write in which the mode hop occurred at 200 ns can be unrecoverable and the HDD Controller can be unaware of this. Therefore, squelching alone can be an insufficient solution for a Preamplifier aiming to provide maximal mode hop detection coverage, whereas the present technical solutions can provide coverage of the entire write interval.

Figure 6:
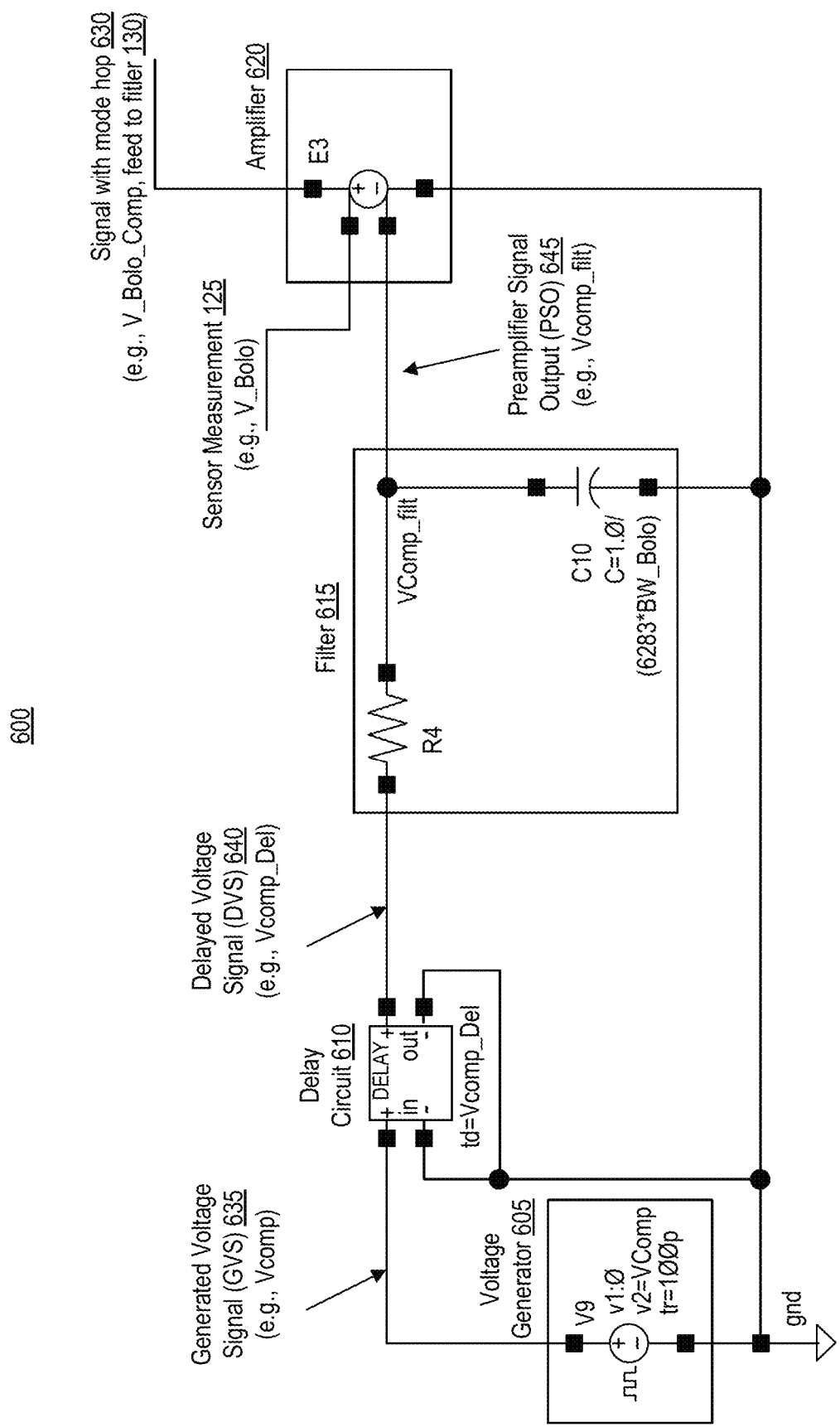
FIG. 6 is an example block diagram of a mode hop detection system using a transducer sensor using preamplification circuit to model a sensor response in a mode hop detection system.

FIG. 6 illustrates an example of a system 600 providing or facilitating an improved laser mode hop detection for an entire operation of the HDD (e.g., including within 1 us of the read to write mode transition event). Example system 600 can be referred to as a compensation circuit having a preamplifier matching the frequency response of the sensor 105. A frequency response can include any characteristic behavior of a circuit, system, or device in response to varying input frequencies. A frequency response can be represented as a plot of amplitude (or gain) versus frequency, showing how the circuit, device or a system transmits, attenuates, or amplifies signals as a function of frequencies within a given frequency range.

Example system 600 can include a voltage generator 605 providing a generated voltage signal (GVS) 635 (e.g., VComp) that is input into a delay circuit 610. Delay circuit 610 can provide a configurable or adjustable delay to the GVS 635 provided by the voltage generator 605 and output a delayed voltage signal (DVS) 640. DVS 640 can be input be input into a filter 615 that can include one or more resistors and capacitors, such as a R4 resistor of 1 kilo ohms (1K) and a capacitor C10 having a capacitance C of $1/(2\pi*BW\_Bolo)$, where $\pi$ is 3.14159 and BW_Bolo is the bandwidth of the sensor 105 signal output. Filter 615 can output a preamplifier signal output (PSO) 645 (e.g., VComp_filt), which can be fed into the amplifier 620 that can also receive sensor measurement 125 from the sensor 105 (e.g., V_Bolo signal). Amplifier 620 can combine these two signals (e.g., subtracting the PSO 645 from the amplified sensor measurement 125) and generate or output signal with mode hop 630. Signal with mode hop 630 (e.g., V_Bolo_Comp) can be sent as an input into the filter 130 of FIG. 1 to be filtered and then processed by peak detector 135 to generate the mode hop detected signal 140 when threshold 160 is exceeded.

At FIG. 6, example system 600 can include or correspond to, a preamplifier circuit, which can include the voltage generator 605, delay circuit 610 and filter 615. Preamplifier circuit (e.g., 605, 610 and 615) can collectively generate a frequency response corresponding to (e.g., correlate to, align with or matching) the frequency response of the sensor 105. For instance, the preamplifier circuit (e.g., 605, 610 and 615) can match the frequency response of the sensor 105 along with any circuitry and contacts of the sensor 105 to the amplifier 620. In some aspects, system 600 includes or corresponds to a preamplifier circuit having a frequency response that corresponds to (e.g., correlates to, aligns with or matches) an inverse of the frequency response of the sensor 105 and its circuitry and contacts providing the sensor measurement 125 to the system 600.

System 600 can include voltage generator 605, that can include any combination of hardware and software, device or circuitry for generating a voltage. Voltage generator 605 can generate GVS 635 that is a step voltage output, such as a step voltage between 0 mV and 100 mV, or any arbitrary amplitude within the range between the external power supplies. Voltage generator 605 can include or utilize programmable switch circuitry for adjusting the voltage level outputs and also providing a response within a time range of about 1ns, such as 0.1 ns, 0.5 ns, 10 ns, 20 ns or longer. Voltage regulator 605 can provide or generate the GVS 635 with adjustable or programmable amplitude (e.g., VComp signal) which can be output from voltage generator 605 and fed into the delay circuit 610.

Delay circuit 610 can include any combination of hardware and software for delaying a GVS 635 signal to provide a configurable, adjustable, or programmable delayed (e.g., time offset) version of the GVS 635, referred to as the delayed voltage signal (DVS) 650. Delay circuit 610 can include a programmable delay element providing a version of the input signal that is delayed by a set time amount of time, such as any time value between 1ns and 20 us, such as up to 500 ns, 1 us, 3 us, 5 us, 10 us, or 20 us. Delay circuit 610 can have a resolution for adjusting the time in the steps of about 10-100 ns, such as at least 10 ns, 20 ns, 30 ns, 50 ns, 70 ns or 100 ns. Delay circuit 610 can provide the delayed output version of the input signal (e.g., VComp_Del) that can be input into the filter 615.

Filter 615 can include any filter (e.g., a low pass, band pass or high pass) that can be used for filtering frequencies DVS 640 that is output from delay circuit 610 and input into filter 615. Filter 615 can include a programmable low pass filter that can have a frequency response that matches the frequency response or characteristics of the sensor 105 (e.g., the bolometer or the photodetector used for detecting optical output 155 of the laser 150). Filter 615 can have a frequency response that matches the frequency response of the sensor 105 and its contact lines, as well as any processing circuitry, such as connection lines or amplification circuitry increasing the gain of the sensor measurement 125 prior to combination of the amplified sensor measurement 125 with an amplified PSO 645). For example, PSO 645 can be subtracted from the sensor measurement 125 prior to, or without making, any gain adjustment to either the sensor measurement 125 or PSO 645.

Filter 615 can include one or more frequency poles adjusting its frequency response. Filter 615 can include a single-pole RC filter whose resistor (e.g., R4) and capacitor (e.g., C10) values can be adjusted, modified, or altered to match the frequency response of the sensor 105 and its signal path to the amplifier 620 where the PSO 645 is to be subtracted from the sensor measurement 125. System 60 can implement the subtraction of the delayed and filtered step voltage from the Bolometer response upon a R2W transition.

The present solution can include a feedforward arrangement in which a matching frequency response of the sensor 105 (e.g., bolometer) can be recreated in the preamplifier (e.g., voltage generator 605, delay circuit 610 and filter 615) and then can be subtracted from the actual sensor 105 response. The laser mode hop events can appear as disturbances in the optical output 155 and can be readily detected since the bulk sensor 105 response due to non-hopped laser power changes (e.g., optical output 155 disturbances caused by R2W mode transitions) can now be cancelled (e.g., by subtracting the PSO 645 from the sensor measurement 125). As a result, the remaining signal with mode hop 630 can include no remaining disturbances due to the R2W transitions, leaving only genuine mode hop events for the system detection.

For example, if the expected sensor 105 output is anticipated to transition from 50 mV to 100 mV upon the R2W transition (FIG. 3), then the value of signal output from the voltage generator 605 (e.g., VComp) can be 100−50=50 mV. Delayed voltage signal 640 (e.g., VComp_Del) can be used to account for propagation delay within the circuitry as the cancellation of the R2W transition can be achieved by the sensor measurements 125 and the PSO 645 arriving at the amplifier 620 and at the peak detector 135, at approximately the same time. The output of the compensation circuit (e.g., signal with mode hop 630, also referred to as V_Bolo_Comp) can be passed directly to the filter 130, amplifier and peak detector 135 discussed in connection with FIG. 1.

Figure 7:
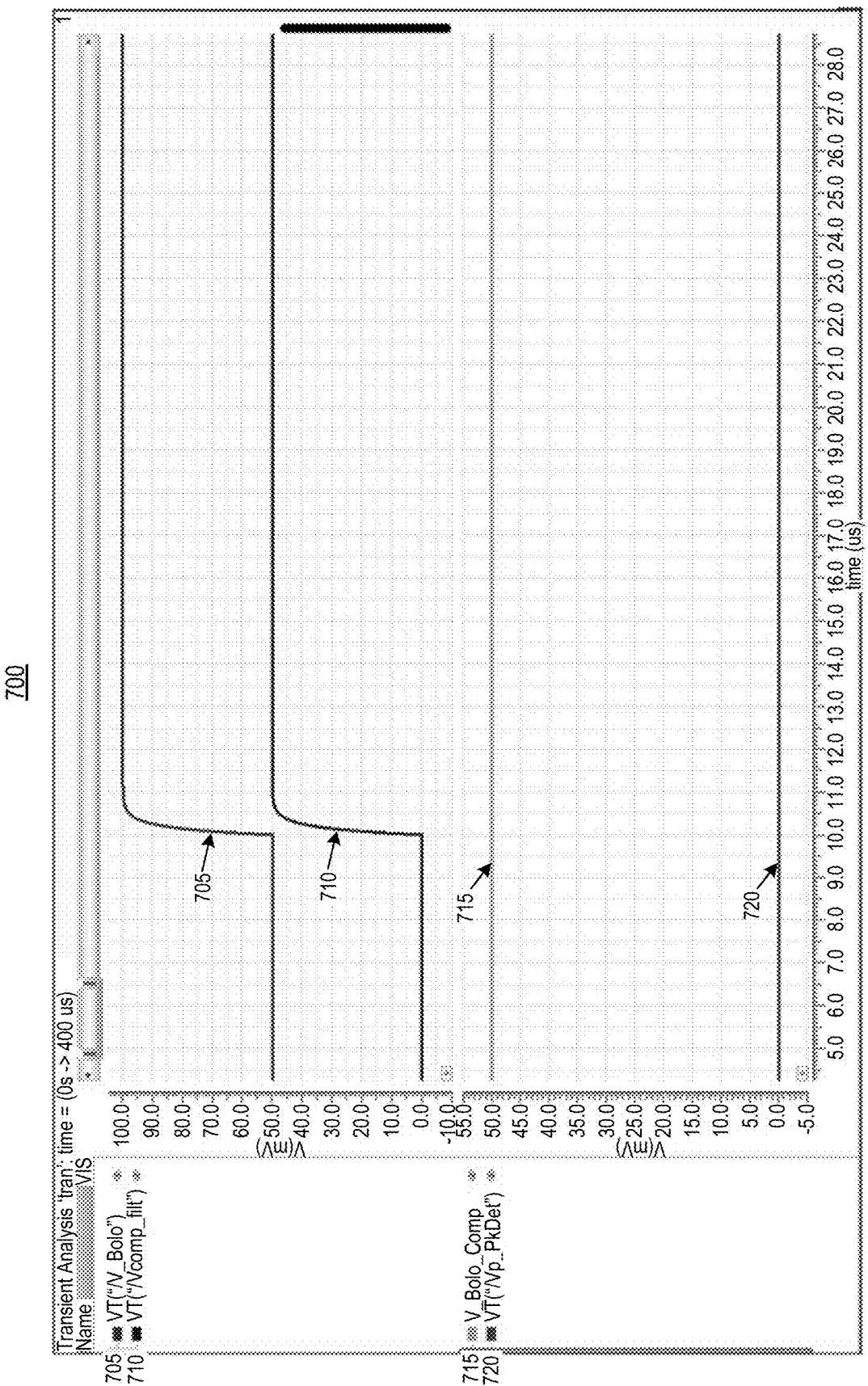
FIGS. 7-12 are examples of waveforms of the operation or results of a mode hop detection system of the present solution.

FIG. 7 shows plot 700 illustrating a performance when the amplitude, delay and filter match the sensor 105 frequency response or characteristics. Preamplifer circuitry (e.g., 605, 610 and 615) can produce a frequency response that matches that of the sensor 105 to within an acceptable threshold tolerance, such as 0.1%, 0.5%, 1%, 2%, 5%, 10% or 15% of the signal, which can be evaluated in terms of timing, amplitude, power, voltage, frequency response (e.g., frequency plot) or event detection. In plot 700, as the transient behavior of PSO 645, (e.g., 710 or VComp_filt) upon the R2W transition matches that of sensor measurement 125 (e.g., 705 or V_Bolo) exactly, the signal with mode hop 630, (e.g., 715 or V_Bolo_Comp signal) and the input of the high pass filter, indicated as (e.g., 720 or Vp_PkDet), can remain undisturbed throughout the transition. This can be accomplished with a static 2 kHz setting of the HPF (i.e., no squelching/masking interval).

Figure 8:
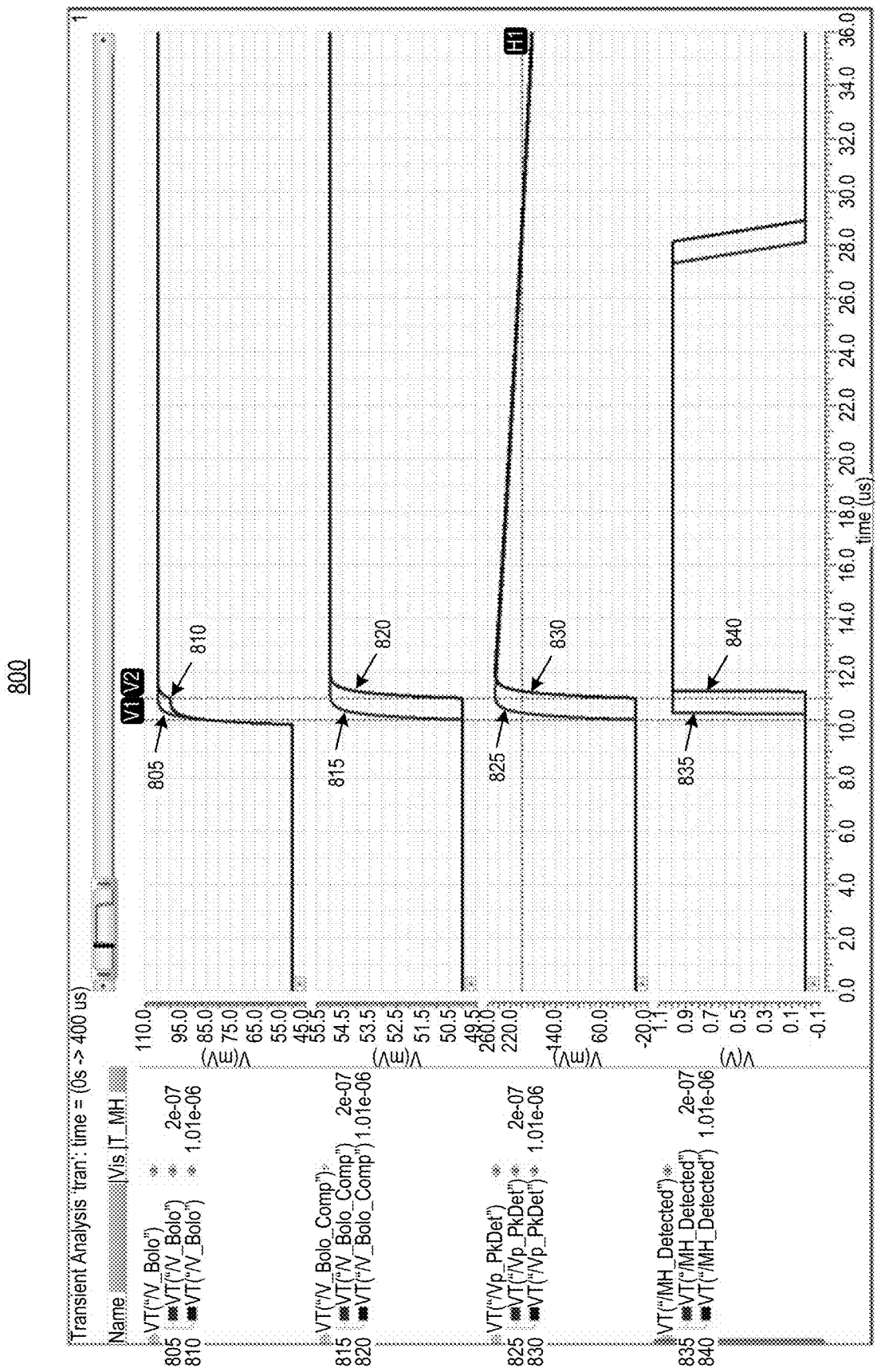

FIG. 8 illustrates example plot 800 showing an example performance and the advantage of the compensation circuit (e.g., system 600) when a 5 m Vmode hop occurs at 200 ns (e.g., waveforms 805, 815, 825 and 835) and at 1 us (e.g., waveforms 810, 820, 830 and 840) into the write event (e.g., following the R2W transition). Because the anticipated baseline excursion can be compensated for and no squelching interval is activated, both mode hops can be detected. The voltage at waveforms 815 and 820 (e.g., V_Bolo_Comp) can increase by 5 mV due to the mode hop. Also, the amplified high pass filtered version of V_Bolo_Comp (e.g., system 600) at the input of the Peak Detector (e.g., waveforms 825 and 830, or Vp_PkDet) can have the same transient characteristics for both events. Stated differently, because the systematic disturbance can be compensated for and the HPF corner can remain at its steady state value (2 kHz), mode hop detection can be available without any spurious activity from the beginning to the end of the write.

In one implementation, the technical solutions can be implemented when one or more features of the baseline transition and the compensating signal (e.g., PSO 645) from the preamplifier (e.g., amplitude, propagation delay and/or frequency) are matched, or matched within a predetermined tolerance threshold, with that of the sensor 105 or sensor measurement 125. For example, PSO 645 can have any combination of signal amplitude, propagation delay (e.g., temporal characteristic of the signal) and/or frequency (e.g., frequency response or signal output) matching those of the sensor measurement 125. When PSO 645 can map (e.g., one to one) for the entirety of the sensor measurement 125, thereby matching with the characteristics of sensor measurement 125 corresponding to the optical output 155 signal artifacts or disturbances caused by R2W transition, subtracting PSO 645 from the sensor measurement 125, all of the optical disturbances, artifacts or other characteristics caused by the R2W transition can be removed, providing a signal with mode hop 630 including only mode hop events. Such mode hop detection events can be seen, for example, in waveforms 835 and 840, corresponding to the 200 ns and 1 us events.

Depending on the manufacturing process of HDDs and their components, there can be variations to the design and/or performance, such as, for example, in mass production of the system where system variations can exist. Sensitivity to each parameter can be provided, for example, in accordance with discussions in connection with FIGS. 9, 10 and 11. For these three figures, detection threshold can be set to 200 mV, as the measurements can be made at signal with mode hop 630 or at the input to the peak detector 135.

Figure 9:
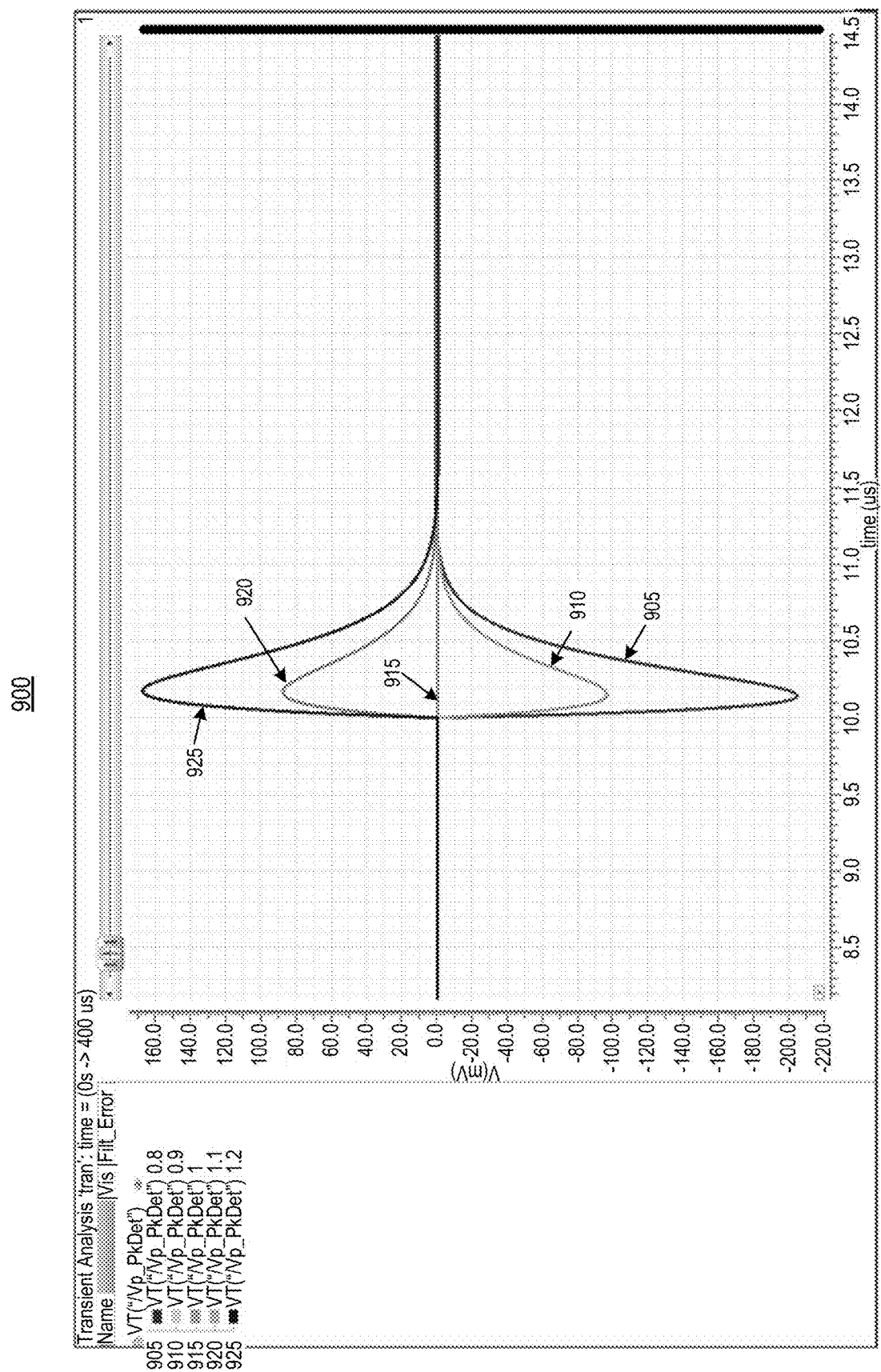

FIG. 9 illustrates plot 900 showing that an error of almost +/−20% in filter frequency can be tolerated before a false event is reported. For example, waveform 905 corresponds to the Vp_PkDet signal when error (e.g., in filter frequency) is −20%. For example, waveform 910 corresponds to the Vp_PkDet signal when error (e.g., in filter frequency) is −10%. For example, waveform 915 corresponds to the Vp_PkDet signal when error (e.g., in filter frequency) is 0%. For example, waveform 920 corresponds to the Vp_PkDet signal when error (e.g., in filter frequency) is +10%. For example, waveform 925 corresponds to the Vp_PkDet signal when error (e.g., in filter frequency) is +20%. As shown in plot 900, matching the signals correctly and reducing the percentage error can benefit the output of the system.

Figure 10:
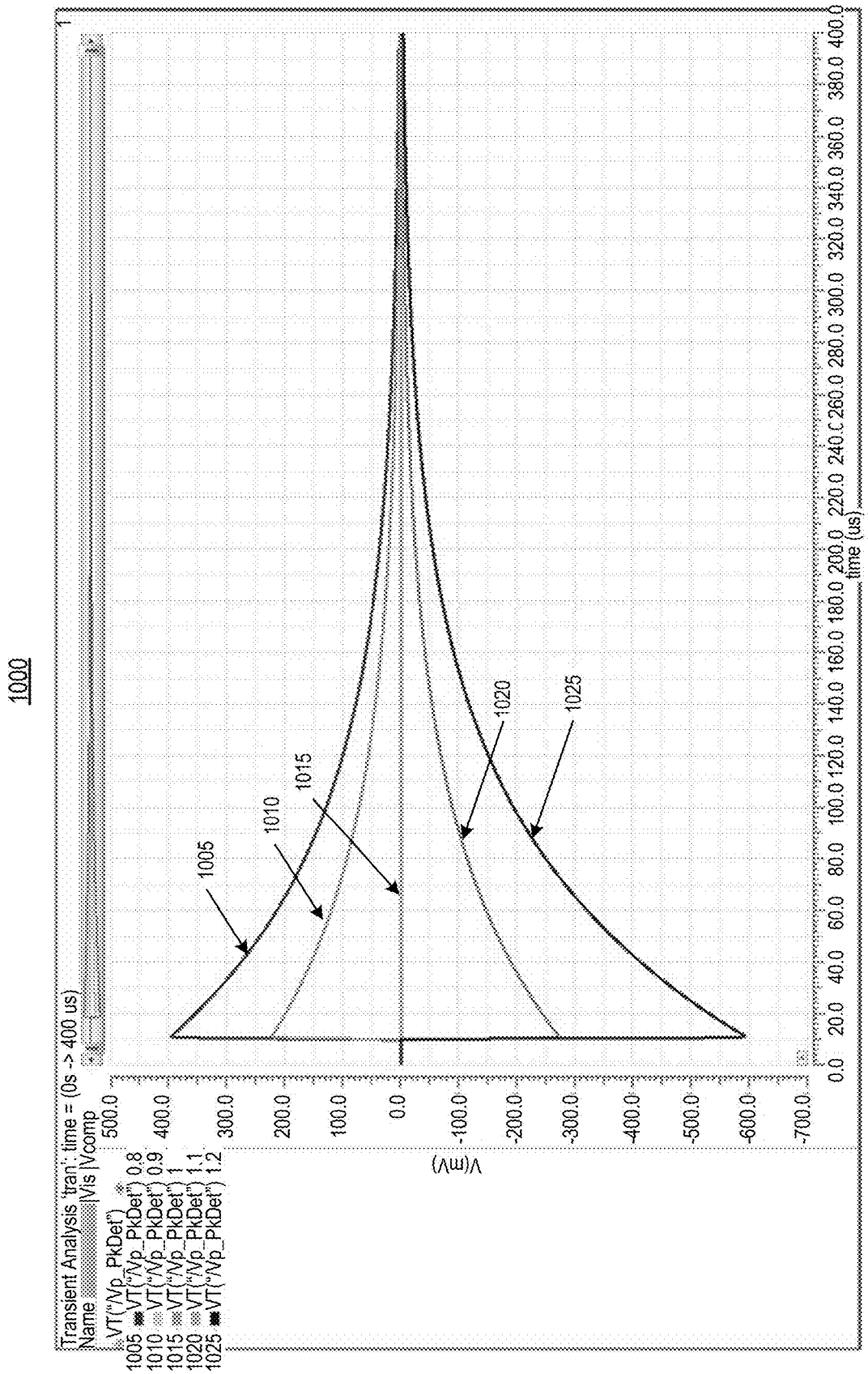

FIG. 10 illustrates plot 1000 showing effects of the amplitude error on the system 600 performance. For example, plot 1000 can show the extent to which system 600 may tolerate an amplitude error (e.g., of about +/−20%), as signal greater than that can create a false event (e.g., an implementation detection can detect both polarities). For example, waveform 1005 corresponds to the Vp_PkDet signal when error (e.g., in amplitude) is −20%. For example, waveform 1010 corresponds to the Vp_PkDet signal when error (e.g., in amplitude) is −10%. For example, waveform 1015 corresponds to the Vp_PkDet signal when error (e.g., in amplitude) is 0%. For example, waveform 1020 corresponds to the Vp_PkDet signal when error (e.g., in amplitude) is +10%. For example, waveform 1025 corresponds to the Vp_PkDet signal when error (e.g., in amplitude) is +20%.

Figure 11:
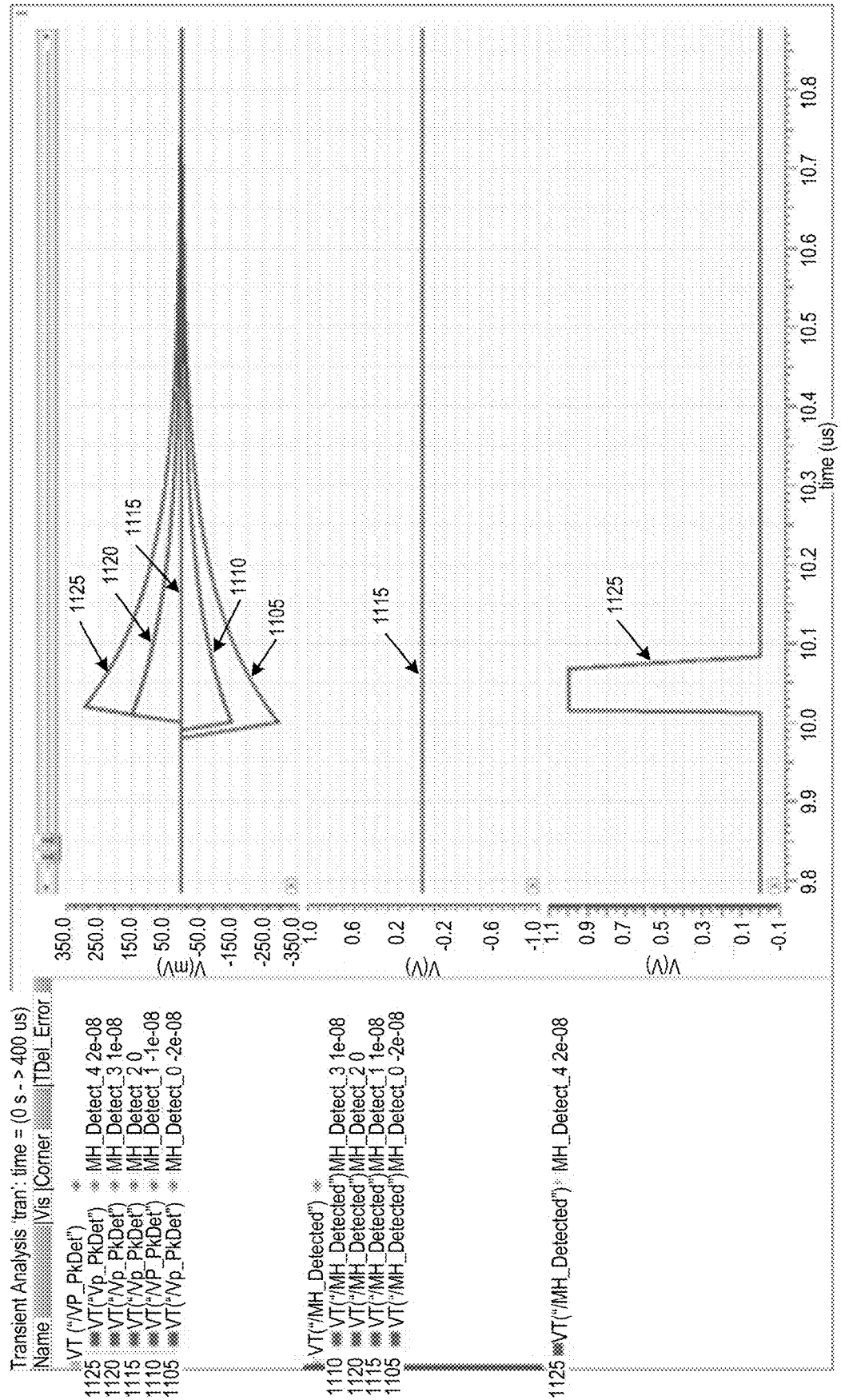

Finally, FIG. 11 illustrates plot 1100 showing that a propagation delay difference can be a sensitive parameter as an error of 20 ns can cause a false event. For example, plot 1100 can show the extent to which system 600 may tolerate delay mismatch or error (e.g., of about +/−20 ns with respect to the measurement signal), as temporal mismatch at about 20 ns can create a false event (e.g., in waveform 1125). For example, waveform 1105 corresponds to the Vp_PkDet signal when delay error (e.g., temporal mismatch) is −20 ns. For example, waveform 1110 corresponds to the Vp_PkDet signal when error (e.g., temporal mismatch) is −10 ns. For example, waveform 1115 corresponds to the Vp_PkDet signal when error (e.g., temporal mismatch) is 10 ns. For example, waveform 1120 corresponds to the Vp_PkDet signal when error (e.g., temporal mismatch) is +10 ns. For example, waveform 1125 corresponds to the Vp_PkDet signal when error (e.g., temporal mismatch) is +20 ns. As shown in waveform 1125, a temporal mismatch of +20 ns causes a false mode hop detection, while waveform 1115 shows a flat mode hop curve (e.g., accurately detecting no mode hop event).

Another aspect of the present solution can include an effective and practical calibration solution, algorithm, or technique. Calibration can be used when producing HDDs in order to fine-tune the system 600 to account for any manufacturing variations. For instance, a calibration solution can be used to achieve full coverage in mass production (e.g., account for product variations to various HDD components or parts). For example, three parameters can be calibrated, such as the voltage amplitude, which can be the first parameter to be calibrated and it can be measured prior to any high pass filtering. The calibration can begin, for example, by measuring the DC output of the sensor 105 (e.g., the bolometer or photodetector) in both read and write modes of HDD operation. Laser 150 can be turned on (e.g., or assumed to be turned on) and the sensor 105 output (e.g., sensor measurement 125) in write mode can adequately represent a real write event. To avoid affecting any recorded data, this can be executed when the Preamplifier is idle or on the standby (e.g., parked on the ramp). At this same measurement point, the user can switch to monitoring the calibration voltage and sweep its controlling DAC until its output matches the previously measured difference in sensor 105 output (e.g., sensor measurement 125) from read to write (V_Bolo_Write-V_Bolo_Read). With the calibrated (e.g., optimal) compensating amplitude established, the user can iterate between the delay and filter settings to optimize both (e.g., reduce delay, frequency, or amplitude errors). For this stage of the calibration, the output of the HPF (i.e., input of the peak detector) can be the monitoring point.

Figure 12:
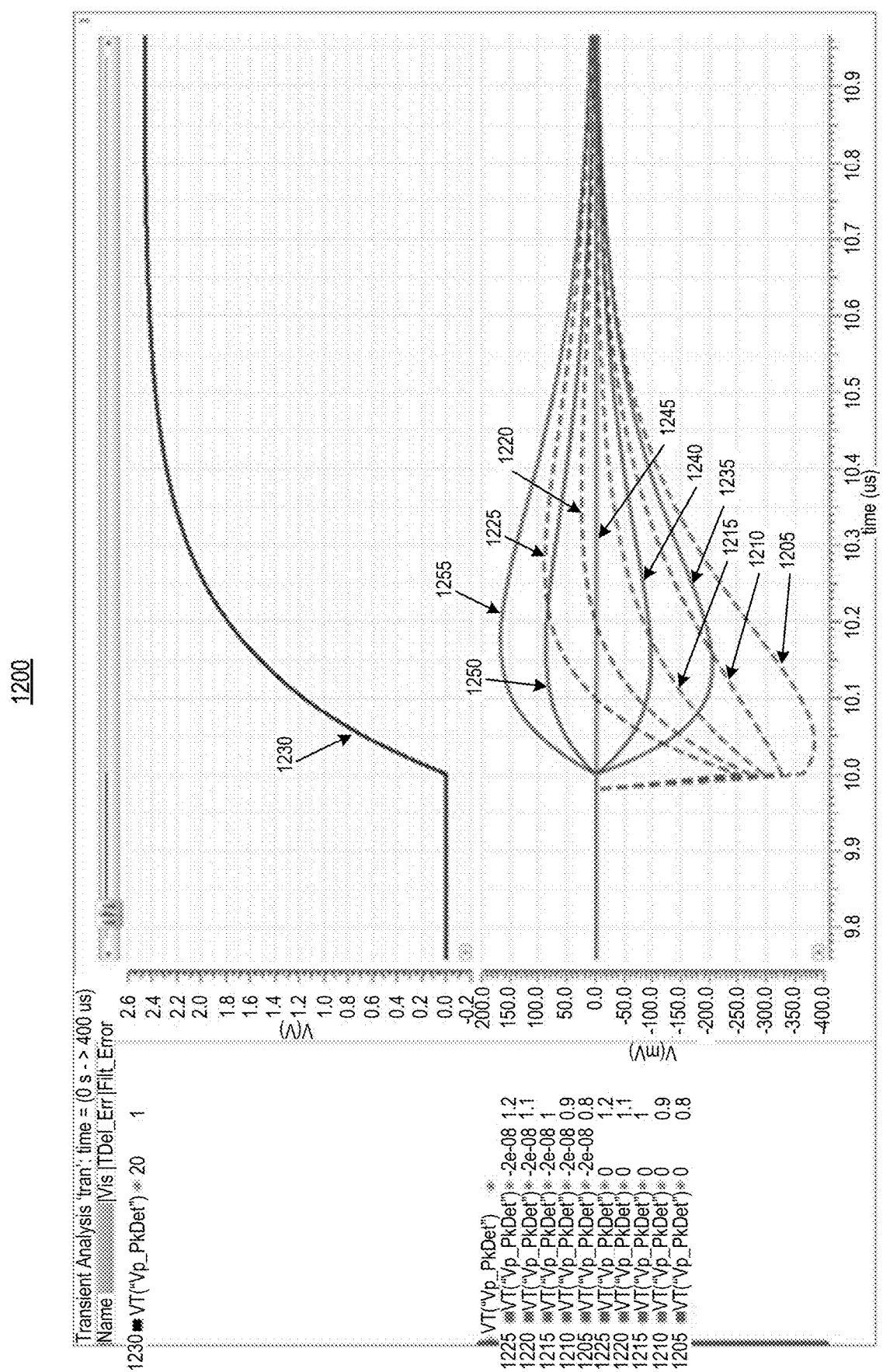

FIG. 12 illustrates plot 1200 showing several waveforms (e.g., 1205-1230), the first of which can include the raw response (e.g., waveform 1230) at the input of the positive peak detector (black) with no compensation applied. Below waveform 1230, can be two sets of waveforms that both sweep filter error from 80% to 120% (e.g., from −20% to +20%). The dotted set of waveforms (e.g., 1205-1225) can show the response when the compensating signal (e.g., PSO 645) leads the raw signal (e.g., sensor measurement 125) by 20 ns (i.e. −20 ns error). The solid waveforms (e.g., 1235-1255) can include the same filter error sweep, but without any propagation delay error. As shown in waveform 1245, when there is no propagation delay error (e.g., the PSO 645 and sensor measurement 125 are aligned in time to within 1ns, subtracting the two signals can result in a flat response, which can allow for detection of any mode hop events reflected in it. If the compensating voltage (e.g., PSO 645) begins too early (e.g., waveform 1210), the voltage can decrease rapidly following the R2W transition at 10 us. If the filter setting is too high (e.g., Filt_Error=1.2, such as in waveforms 1220 and 1225) then the voltage can overshoot (i.e., go back above 0 mV). Plot 1200 can show that because event detection can be bidirectional, the outputs of the positive and negative peak detectors can be monitored together as the user executes a full factorial sweep of the delay and filter settings via firmware.

To further elaborate upon the proposed method further, the delay error can be swept from −10 ns to +10 ns in steps of 1ns. Within the same sweep filter frequency can be swept from 0.9 to 1.1 with a step size of 0.025 (i.e., a +/−10% error range with 2.5% step size). First, the solution can include setting the threshold of the comparators at 20 mV which can represent 10% of the target threshold value of mode hop detection.

FIG. 13 shows table 1300 with the results. In table 1300, when delay is matched within +/−1 ns and filter frequency is matched within +/−2.5%, both positive and negative comparators (as well as their logical OR) can operate so as to not report an event. This is evident in the MH P, MH_N and MH measurements reported in the figure/table 1300, respectively. Table 1300 can reflect or refer to a solution, technique or algorithm that can be effective in allowing the user to correctly optimize both the delay and filter frequency values after having first optimized amplitude. For example, sweep this amplitudes of the sensor 105 and compensation signals match.

FIG. 13 also reveals that amplitude, delay and filter frequency matching can eliminate false events using a 20 mV threshold. This suggests that the implementation can offer high resolution sweep capability. A wide tuning range may also be used if the sensor 105 amplitude and frequency responses present variation greater than a threshold (e.g., for which false readings can occur). The range of delay tuning can be wide enough to cover expected full path propagation delay variation over process, voltage, and temperature.

As shown in table 1400 of FIG. 14, in continuation with the sensitivity analysis, if the system can tolerate a baseline error of 40 mV (V_Threshold=40 mV), then the allowable delay and filter error can increase to +/−2 ns and +/−5%, respectively. As shown in table 1500 of FIG. 15, in continuation with the sensitivity analysis, if the detection threshold can be relaxed to 80 mV, the tolerable delay and filter errors can increase to +/−5 ns and +/−10%, respectively.

In some aspects, the calibration results may or may not use a squelching interval and the technical solutions can allow the mode hop detection to be available within less than 1 ns, or 0.1 ns from the start of the write operation, therefore functionally covering the entire duration of the write mode. In some aspects, system 600 can include a short squelching interval to relax the matching requirements of the compensating signal to that from the sensor 105 because the peak amplitude of the excursion can occur near the beginning of the R2W transition. In addition to raising the HPC to a higher frequency (e.g., 20 MHz), another effective means of squelching can include shorting the inputs of the peak detectors at the beginning of the write until the squelch interval ends. This additional technique can be reflected or used in connection with the solution reflected in table 1600 of FIG. 16 and table 1700 of FIG. 17, which show results using 20 m V calibration threshold. By comparing the results in table examples 1300, 1600 and 1700 of FIGS. 13, 16 and 17, respectively, we can see the tradeoff between compensation signal accuracy vs. squelching times of 0 ns, 50 ns and 100 ns, respectively. Therefore, a calibrated (e.g., optimal) solution can employ a compensating signal, calibration, and some programmable squelch interval where "no squelching" is an option.

Figure 18:
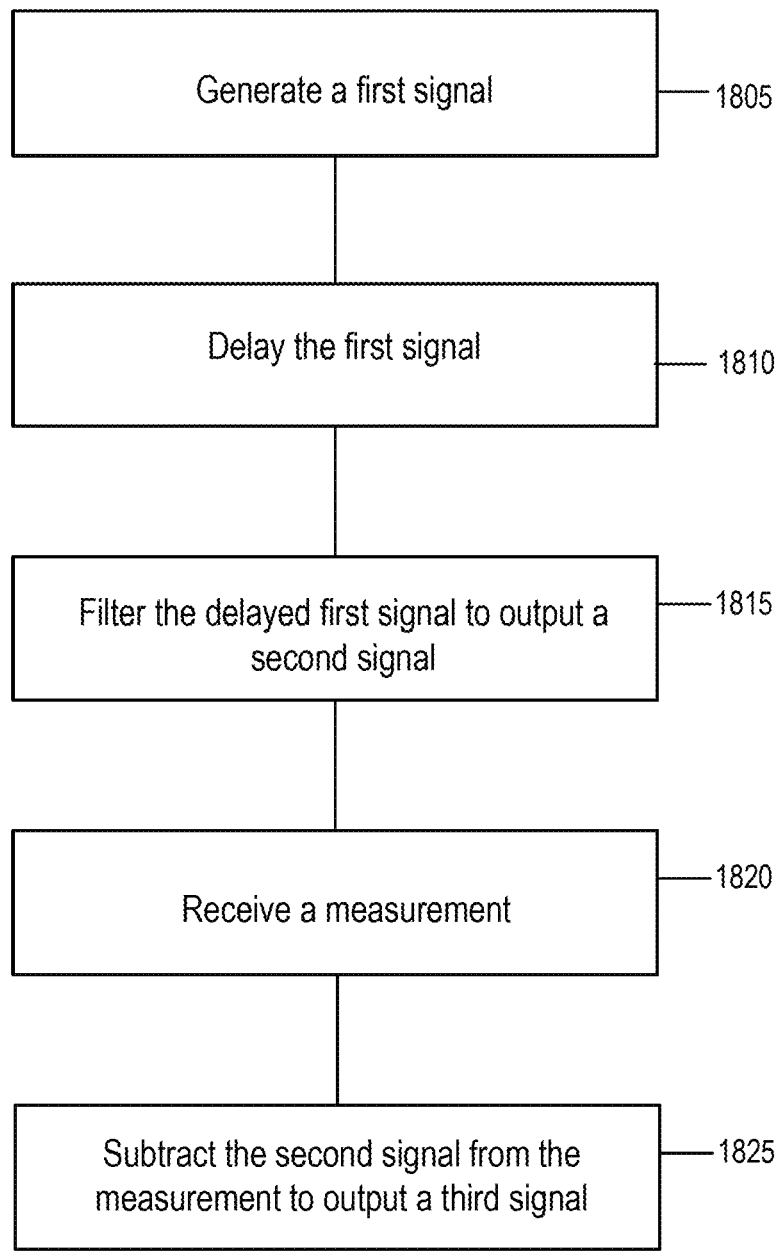
FIG. 18 illustrates an example flow diagram of a method for providing a mode hop detection in accordance with the embodiments of the present solution.

FIG. 18 is an example flow diagram of a method 1800 method for providing laser mode hop detection in a hard disk drive in accordance with the embodiments of the present solution. Method 1800 can include acts 1805 through 1825 that can be implemented, for example, using a combination of systems 100 and 600 shown or described in connection with FIGS. 1-17. For example, at 1805, the method can include generating a first signal. At 1810, the method can include delaying the first signal. At 1815, the method can include filtering the delayed first signal to output a second signal. At 1820, the method can include receiving a measurement. At 1825, the method can include subtracting the second signal from the measurement to output a third signal.

At 1805, the method can include generating a first signal. The method can include a first circuitry generating a first signal representing a transition from a read operation of a storage device to a write operation of the storage device. The first circuitry can include a voltage generator that can generate the first signal. The first signal can include a generated voltage signal. Generated voltage signal can include a step voltage signal having an amplitude configured according to a control signal.

The first signal (e.g., generated voltage signal) can include an increase from a first voltage corresponding to the read operation to a second voltage corresponding to the write operation. The difference between the first voltage and the second voltage can include a value of voltage within a range of between 10 mV and 100 mV. The value corresponding to the difference between the first voltage and the second voltage can be adjustable using a control signal for controlling the first circuitry.

At 1810, the method can include delaying the first signal. The method can include the first circuitry delaying the first signal according to a first time period. The first circuit can include a delay circuit receiving generated voltage signal from the voltage generator. The delay circuit can delay, temporally shift, or offset in time the generated voltage signal by a duration of the first time period.

The first time period can correspond to a time of a start of the transition, such as a read to write (R2W) transition of the HDD. For example, the first time period by which the generated voltage signal is delayed or adjusted can be, or can include, a duration of time that causes a rise of the delayed first signal to a rise in a sensor measurement indicative of the R2W event reflected or indicated in the optical output of the laser.

The method can include the delay circuit of the first circuitry using the first time period to align a time of the transition indicated by the second signal with a time of the transition indicated by the measurement from the sensor. For example, the first time period can be adjusted to match a delay of one or more circuits, such as a propagation delay of the preamplifier, propagation delay of the sensor or propagation delay of any one or more of: sensor, any of the filters, peak detector, voltage generator, delay circuit and/or amplifier. The first time period can be a value within a range of between 500 picoseconds and 10 microseconds. The value can be adjustable according to a control signal for controlling a delay circuit of the first circuitry.

At 1815, the method can include filtering the delayed first signal to output a second signal. The method can include a filter coupled with the first circuitry filtering, from the delayed first signal, frequencies above a threshold to output a second signal according to a second time period of a frequency response of the filter. The filter can include a low pass filter. The filter can include a band pass filter or a high pass filter. The filter can include a resistor and a capacitor, such as a resistor placed in parallel, or in series, with a capacitor. The filter can include a resistor and an inductor, such as a resistor placed in parallel or in series with an inductor. The filter can include a combination of a resistor, an inductor, and a capacitor, which can be arranged in any combination of parallel, series or a combination of parallel and series arrangement.

The filter can include one or more frequency poles defined, set, or controlled based on its components or parts, such as its resistor(s), capacitor(s) and/or inductor(s). The filter can be a low pass filter that can attenuate, diminish, block, or filter the frequencies above the threshold based on a pole defined by values of a resistor and a capacitor arranged in parallel and defining a frequency response of the filter. The filter can adjust the delayed first signal to have its rise from a lower voltage level to a higher voltage level extended, expanded, or spread over the second time period that is defined by the frequency response of the filter. The second time period can correspond to a time duration over which a change in the delayed voltage signal (e.g., time offset generated voltage signal) is scaled in time or spread over time. The second time period can include or correspond to a time duration in which the measurement from a sensor of the second circuitry transitions from a first level of the measurement corresponding to the read operation to a second level of the measurement corresponding to the write operation.

At 1820, the method can include receiving a measurement. The method can include a second circuitry receiving a measurement of an optical output of a laser of the storage device going through the transition and having a mode hop of the laser. The second circuitry can include any combination of a sensor, conducting lines for the sensor, a filter (e.g., a low pass, band pass or high pass filter), and/or an amplifier. The second circuitry can receive the measurement of an optical output of the laser, by monitoring a portion of the optical output, such as a reflection of the optical signal. The storage device can be experiencing or going through the transition, such as a read to write transition. The signal can indicate, experience, or reflect a mode hop of the laser. The measurement can reflect, include, indicate, or be shaped based at least on the frequency response of the second circuitry. The frequency response of the second circuitry can correspond to the frequency response of the filter.

The frequency response of the second circuitry can match the frequency response of the filter, and vice versa. For example, the filter can amplify or attenuate signals over a range of frequencies so as to match, align with, mimic or be equal to the amplification or attenuation of sensor measurements over the same range of frequencies. For example, the filter can provide an output having an amplitude at a particular frequency or frequency range that matches, is same as, or corresponds to an amplitude of the output of the sensor measurement for a particular signal at the sensor at the same frequency or frequency range.

The received measurement can include a first portion and a second portion of the signal or measurement. The first portion can correspond to an artifact or a disturbance in the optical output of the laser. The artifact or a disturbance can be caused by an increase in power input into the laser responsive to the transition, such as a transition from a read mode to a write mode of the HDD. The received measurement can include a second portion corresponding to the mode hop of the laser occurring during or after the disturbance. The second portion can include, reflect, or indicate a mode hop event that is within a time range of a disturbance in the optical output caused by a read to write transition. The time range between the mode hop event and the transition can be a range of anywhere between 0.1 ns and 20 us, such as 20 us, 10 us, 5 us, 3 us, 2 us, 1 us, 0.5 us, 0.3 us, 0.2 us, 0.1 us, 50 ns, 40 ns, 20 ns, 10 ns, 1 ns or 0.1 ns.

The method can include a sensor of the second circuitry providing a signal of the sensor corresponding to the optical output of the laser. The signal can correspond to a measurement of a particular fraction of the optical output of the laser, such as a portion of a laser beam or a reflection of the laser beam. The signal can correspond to a particular percentage of the optical output, such as up to 0.1%, 1%, 2%, 5%, or more of the signal.

The method can include a resistor of the filter and a capacitor of the filter configuring the frequency response of the filter to match the frequency response of the second circuitry. The resistor can be coupled with an output of the delay circuit of the first circuitry. The capacitor can include a first contact coupled with the resistor and a second contact coupled with a ground. For example, the resistor can be arranged in parallel with the capacitor, where a delayed voltage signal from the delay circuit is input into the resistor. For example, the capacitor can have a value of, or corresponding to, an inverse of 2π multiplied by bandwidth of sensor output or sensor measurement (e.g., 2*3.14159*bandwidth of sensor response).

The method can include amplifying, by an amplification circuit of the second circuitry, the signal of the sensor and produce the measurement, wherein the sensor is one of a bolometer or a photodetector and the amplification circuit includes a differential amplifier configured to subtract the second signal from the measurement to output the third signal.

At 1825, the method can include subtracting the second signal from the measurement to output a third signal. The method can include the second circuitry subtracting the second signal from the measurement (e.g., from the sensor) to output a third signal identifying an occurrence of the mode hop of the laser. The second circuitry can include, for example, an amplification circuit or an amplifier to combine the measurement signa land the second signal from the filter of the preamplifier. For example, the second circuitry can include a differential amplifier or a subtraction circuit to subtract the sensor measurement signal from the second signal output from the filter of the preamplifier.

The method can include the second circuitry subtracting the second signal from the measurement to eliminate, from the (resulting) third signal, a first portion of the measurement identifying an occurrence of the mode hop of the laser. The second circuitry can subtract the sensor measurement from the second signal output from the filer of the preamplifier in order to eliminate, from the sensor measurement signal, the disturbance or artifact of the read to write transition, thereby producing the third signal in which the mode hop event can be detected. The mode hop of the laser can occur at any time following a start of the transition, such as within 0.6 us, 0.3 us, 0.1 us or 0.05 us.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., delay circuit, filter, peak detector) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. At least portions of the technical solutions can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
    a first circuitry to generate a first signal representing a transition from a read operation of a storage device to a write operation of the storage device and delay the first signal according to a first time period;
    a filter coupled with the first circuitry to filter, from the delayed first signal, frequencies above a threshold and output a second signal according to a second time period of a frequency response of the filter;
    a second circuitry to receive a measurement of an optical output of a laser of the storage device going through the transition and having a mode hop of the laser, a frequency response of the second circuitry indicated by the measurement and corresponding to the frequency response of the filter;
    wherein the second circuitry to subtract the second signal from the measurement to output a third signal identifying an occurrence of the mode hop of the laser.

2. The system of claim 1, wherein the first signal includes an increase from a first voltage corresponding to the read operation to a second voltage corresponding to the write operation and wherein the first time period corresponds to a time of a start of the transition.

3. The system of claim 1, wherein a difference between the first voltage and the second voltage is a value within a range of between 1 mV and 1000 mV, the value adjustable according to a first control signal for controlling the first circuitry.

4. The system of claim 1, comprising:
    a delay circuit of the first circuitry to align a time of the transition indicated by the second signal with a time of the transition indicated by the measurement using the first time period.

5. The system of claim 1, wherein the first time period is adjustable to a time duration value within a range of between 500 ps and 10 us according to a second control signal for controlling a delay circuit of the first circuitry.

6. The system of claim 1, comprising:
    a resistor of the filter, the resistor coupled with an output of the delay circuit of the first circuitry; and
    a capacitor of the filter, the capacitor having a first contact coupled with the resistor and a second contact coupled with a ground, wherein the resistor and the capacitor configure the frequency response of the filter to match the frequency response of the second circuitry.

7. The system of claim 1, comprising:
    a sensor of the second circuitry, the sensor configured provide a signal of the sensor corresponding to the optical output of the laser; and
    an amplification circuit of the second circuitry to amplify the signal of the sensor and produce the measurement.

8. The system of claim 7, wherein the sensor is an optoelectronic transducer and the amplification circuit includes a differential amplifier configured to subtract the second signal from the measurement to output the third signal.

9. The system of claim 1, wherein the second time period corresponds to a time duration in which the measurement from a sensor of the second circuitry transitions from a first level of the measurement corresponding to the read operation to a second level of the measurement corresponding to the write operation.

10. The system of claim 1, wherein the measurement includes a first portion corresponding to a disturbance in the optical output of the laser caused by an increase in power input into the laser responsive to the transition and a second portion corresponding to the mode hop of the laser occurring during or after the disturbance.

11. The system of claim 10, wherein the wherein the second circuitry is configured to subtract the second signal from the measurement to eliminate the first portion of the measurement from the third signal identifying an occurrence of the mode hop of the laser.

12. The system of claim 1, wherein the mode hop of the laser occurs within 1 microsecond following a start of the transition.

13. The system of claim 1, wherein the third signal is input into a third circuitry, the third circuitry comprising at least: a bandpass filter, an amplifier and a peak detector to detect the occurrence of the mode hop event responsive to a peak in a signal output from the amplifier and filtered by the bandpass filter exceeding a threshold value of the peak detector.

14. A method, comprising:
generating, by a first circuitry, a first signal representing a transition from a read operation of a storage device to a write operation of the storage device;
delaying, by the first circuitry, the first signal according to a first time period;
filtering, by a filter coupled with the first circuitry, from the delayed first signal, frequencies above a threshold to output a second signal according to a second time period of a frequency response of the filter;
receiving, by a second circuitry, a measurement of an optical output of a laser of the storage device going through the transition and having a mode hop of the laser, the measurement indicating a frequency response of the second circuitry corresponding to the frequency response of the filter; and
subtracting, by the second circuitry, the second signal from the measurement to output a third signal identifying an occurrence of the mode hop of the laser.

15. The method of claim 14, wherein the first signal includes an increase from a first voltage corresponding to the read operation to a second voltage corresponding to the write operation and the first time period corresponds to a time of a start of the transition, and wherein a difference between the first voltage and the second voltage is value within a range of between 1 mV and 1000 mV, the value adjustable using a first control signal for controlling the first circuitry.

16. The method of claim 14, comprising:
aligning, by a delay circuit of the first circuitry using the first time period, a time of the transition indicated by the second signal with a time of the transition indicated by the measurement, wherein the first time period is a value within a range of between 500 picoseconds and 20 microseconds, the value adjustable according to a second control signal for controlling a delay circuit of the first circuitry.

17. The method of claim 14, comprising:
configuring, by a resistor of the filter and a capacitor of the filter, the frequency response of the filter to match the frequency response of the second circuitry, wherein the resistor is coupled with an output of the delay circuit of the first circuitry and the capacitor includes a first contact coupled with the resistor and a second contact coupled with a ground;
providing, by a sensor of the second circuitry, a signal of the sensor corresponding to the optical output of the laser; and
amplifying, by an amplification circuit of the second circuitry, the signal of the sensor and produce the measurement, wherein the sensor is an optoelectronic transducer and the amplification circuit includes a differential amplifier configured to subtract the second signal from the measurement to output the third signal.

18. The method of claim 14, wherein:
the second time period corresponds to a time duration in which the measurement from a sensor of the second circuitry transitions from a first level of the measurement corresponding to the read operation to a second level of the measurement corresponding to the write operation; and
the measurement includes a first portion corresponding to a disturbance in the optical output of the laser caused by an increase in power input into the laser responsive to the transition and a second portion corresponding to the mode hop of the laser occurring during or after the disturbance.

19. The method of claim 14, comprising:
subtracting, by the second circuitry, the second signal from the measurement to eliminate, from the third signal, a first portion of the measurement identifying an occurrence of the mode hop of the laser, wherein the mode hop of the laser occurs within 1 microsecond following a start of the transition.

20. A storage device system, comprising:
a voltage generator to generate a first signal representing a transition from a read operation of a storage device to a write operation of the storage device;
a delay circuit to delay the first signal according to a first time period;
a filter coupled with the delay circuit to filter, from the delayed first signal, frequencies above a threshold, and output a second signal according to a second time period of a frequency response of the filter; and
an amplifier to:
receive, from the filter, the second signal;
receive, from a sensor, a measurement of an optical output of a laser of the storage device going through the transition and having a mode hop of the laser, the measurement indicative of a frequency response of the second circuitry matching the frequency response of the filter; and
subtract the second signal from the measurement to output a third signal identifying an occurrence of the mode hop of the laser.

* * * * *